United States Patent
Nale et al.

(10) Patent No.: US 10,282,322 B2
(45) Date of Patent: May 7, 2019

(54) MEMORY CHANNEL THAT SUPPORTS NEAR MEMORY AND FAR MEMORY ACCESS

(71) Applicant: Intel Corporation, Santa Clara, CA (US)

(72) Inventors: Bill Nale, Livermore, CA (US); Raj K. Ramanujan, Federal Way, WA (US); Muthukuman P. Swaminathan, Folsom, CA (US); Tessil Thomas, Bangalore (IN); Taarinya Polepeddi, London (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/482,542

(22) Filed: Apr. 7, 2017

(65) Prior Publication Data
US 2017/0249266 A1    Aug. 31, 2017

Related U.S. Application Data

(60) Continuation of application No. 15/081,164, filed on Mar. 25, 2016, now Pat. No. 9,619,408, which is a
(Continued)

(51) Int. Cl.
*G06F 13/16* (2006.01)
*G06F 13/42* (2006.01)
(Continued)

(52) U.S. Cl.
CPC .......... *G06F 13/1694* (2013.01); *G06F 9/467* (2013.01); *G06F 11/1064* (2013.01);
(Continued)

(58) Field of Classification Search
CPC ... G06F 13/1694; G06F 13/4068; G06F 13/42
(Continued)

(56) References Cited

U.S. PATENT DOCUMENTS 5,459,856 A    10/1995 Inoue
5,517,615 A    5/1996 Sefidvash
(Continued)

FOREIGN PATENT DOCUMENTS

CN    1230750 C    12/2005
CN    1732433 A    2/2006
(Continued)

OTHER PUBLICATIONS

Dhiman, et al. "PDRAM: A Hybrid PRAM and DRAM Main Memory System", Jul. 26, 2009, Department of Computer Science and Engineering, 6 pages.
(Continued)

Primary Examiner — Christopher B Shin
(74) Attorney, Agent, or Firm — Compass IP Law PC

(57) ABSTRACT

A semiconductor chip comprising memory controller circuitry having interface circuitry to couple to a memory channel. The memory controller includes first logic circuitry to implement a first memory channel protocol on the memory channel. The first memory channel protocol is specific to a first volatile system memory technology. The interface also includes second logic circuitry to implement a second memory channel protocol on the memory channel. The second memory channel protocol is specific to a second non volatile system memory technology. The second memory channel protocol is a transactional protocol.

20 Claims, 18 Drawing Sheets

Related U.S. Application Data division of application No. 13/977,603, filed as application No. PCT/US2011/054421 on Sep. 30, 2011, now Pat. No. 9,342,453.

(51) Int. Cl.

| | | |
|---|---|---|
| *G06F 12/0868* | (2016.01) | |
| *G06F 11/10* | (2006.01) | |
| *G06F 12/0802* | (2016.01) | |
| *G06F 12/0804* | (2016.01) | |
| *G06F 12/0897* | (2016.01) | |
| *G06F 9/46* | (2006.01) | |
| *G06F 13/40* | (2006.01) | |
| *G06F 12/02* | (2006.01) | |
| *G06F 12/0811* | (2016.01) | |

(52) U.S. Cl.
CPC ...... *G06F 12/0238* (2013.01); *G06F 12/0802* (2013.01); *G06F 12/0804* (2013.01); *G06F 12/0868* (2013.01); *G06F 12/0897* (2013.01); *G06F 13/1668* (2013.01); *G06F 13/4068* (2013.01); *G06F 13/42* (2013.01); *G06F 13/4234* (2013.01); *G06F 12/0811* (2013.01); *G06F 2212/1008* (2013.01); *G06F 2212/1016* (2013.01); *G06F 2212/1044* (2013.01); *G06F 2212/2024* (2013.01); *G06F 2212/7203* (2013.01); *Y02D 10/13* (2018.01); *Y02D 10/14* (2018.01); *Y02D 10/151* (2018.01)

(58) Field of Classification Search
USPC ................. 711/100, 148; 710/1, 11
See application file for complete search history.

(56) References Cited

U.S. PATENT DOCUMENTS

| | | | |
|---|---|---|---|
| 5,822,251 A | 10/1998 | Bruce | |
| 5,912,839 A | 6/1999 | Ovshinsky et al. | |
| 5,917,743 A | 6/1999 | Roy | |
| 6,031,762 A | 2/2000 | Saitoh | |
| 6,161,208 A | 12/2000 | Dutton | |
| 6,259,627 B1 | 7/2001 | Wong | |
| 6,298,418 B1 | 10/2001 | Fujiwara et al. | |
| 6,493,776 B1 | 12/2002 | Courtright et al. | |
| 6,559,850 B1 * | 5/2003 | Strongin ............. G06F 13/1626 345/520 | |
| 6,707,948 B1 | 3/2004 | Cosman et al. | |
| 6,922,350 B2 | 7/2005 | Coulson et al. | |
| 7,328,304 B2 | 2/2008 | Royer et al. | |
| 7,478,197 B2 | 1/2009 | Shen et al. | |
| 7,486,575 B2 | 2/2009 | Park | |
| 7,516,267 B2 | 4/2009 | Coulson et al. | |
| 7,533,215 B2 | 5/2009 | Faber | |
| 7,590,918 B2 | 9/2009 | Parkinson | |
| 7,600,078 B1 | 10/2009 | Cen et al. | |
| 7,681,004 B2 | 3/2010 | Bonella | |
| 7,756,053 B2 | 7/2010 | Thomas et al. | |
| 7,797,479 B2 | 9/2010 | Trika et al. | |
| 7,827,348 B2 | 11/2010 | Lee et al. | |
| 7,911,952 B1 | 3/2011 | Nygreen et al. | |
| 7,913,147 B2 | 3/2011 | Swaminathan et al. | |
| 7,941,692 B2 | 5/2011 | Royer et al. | |
| 7,962,715 B2 | 6/2011 | Ware | |
| 8,051,253 B2 | 11/2011 | Okin et al. | |
| 8,065,479 B2 | 11/2011 | Humlicek | |
| 8,156,288 B2 | 4/2012 | Karamcheti | |
| 8,296,534 B1 | 10/2012 | Gupta et al. | |
| 8,462,537 B2 | 6/2013 | Karpov et al. | |
| 8,462,577 B2 | 6/2013 | Zeng et al. | |
| 8,463,948 B1 | 6/2013 | Qawami et al. | |
| 8,595,597 B2 | 11/2013 | Xie et al. | |
| 8,605,531 B2 | 12/2013 | Kau | |
| 8,607,089 B2 | 12/2013 | Qawami et al. | |
| 8,612,666 B2 | 12/2013 | Royer et al. | |
| 8,612,676 B2 | 12/2013 | Dahlen et al. | |
| 8,612,809 B2 | 12/2013 | Casper et al. | |
| 8,649,212 B2 | 2/2014 | Kau et al. | |
| 8,838,935 B2 | 9/2014 | Hinton et al. | |
| 9,064,560 B2 | 6/2015 | Qawami et al. | |
| 9,087,584 B2 | 7/2015 | Dahlen et al. | |
| 9,690,493 B2 | 6/2017 | Dahlen et al. | |
| 2002/0007441 A1 | 1/2002 | Palanca et al. | |
| 2003/0005266 A1 | 1/2003 | Akkary et al. | |
| 2003/0023812 A1 | 1/2003 | Nalawadi et al. | |
| 2004/0078523 A1 | 4/2004 | Chauvel | |
| 2004/0218440 A1 | 11/2004 | Kumar et al. | |
| 2005/0063220 A1 | 3/2005 | Johnson | |
| 2005/0066114 A1 | 3/2005 | Barth | |
| 2005/0086417 A1 * | 4/2005 | Meyer ................. G06F 13/161 711/5 | |
| 2006/0179333 A1 | 8/2006 | Brittain et al. | |
| 2006/0200597 A1 * | 9/2006 | Christenson ........ G06F 13/1626 710/57 | |
| 2007/0005922 A1 | 1/2007 | Swaminathan et al. | |
| 2007/0079217 A1 | 4/2007 | Haugan et al. | |
| 2007/0156993 A1 | 7/2007 | Alexander | |
| 2007/0186060 A1 * | 8/2007 | Nayyar ............... G06F 13/4022 711/154 | |
| 2008/0016269 A1 | 1/2008 | Chow et al. | |
| 2008/0022041 A1 | 1/2008 | Nakajima | |
| 2008/0034148 A1 | 2/2008 | Gower et al. | |
| 2008/0040563 A1 | 2/2008 | Brittain | |
| 2008/0082720 A1 | 4/2008 | Moyer | |
| 2008/0082766 A1 | 4/2008 | Okin et al. | |
| 2008/0104329 A1 | 5/2008 | Gaither et al. | |
| 2008/0155185 A1 | 6/2008 | Kim | |
| 2008/0235443 A1 | 9/2008 | Chow et al. | |
| 2008/0270811 A1 | 10/2008 | Chow et al. | |
| 2009/0043966 A1 | 2/2009 | Shen et al. | |
| 2009/0049234 A1 | 2/2009 | Oh et al. | |
| 2009/0144492 A1 | 6/2009 | Barth et al. | |
| 2009/0172267 A1 | 7/2009 | Oribe et al. | |
| 2009/0175090 A1 | 7/2009 | Smolka | |
| 2009/0198877 A1 | 8/2009 | Pua et al. | |
| 2009/0254714 A1 * | 10/2009 | Nayyar ............... G06F 13/4022 711/151 | |
| 2009/0307418 A1 | 12/2009 | Chen | |
| 2009/0313416 A1 | 12/2009 | Nation | |
| 2009/0327837 A1 | 12/2009 | Royer et al. | |
| 2010/0005212 A1 | 1/2010 | Gower et al. | |
| 2010/0037122 A1 | 2/2010 | Blackmon et al. | |
| 2010/0058094 A1 | 3/2010 | Miyazaki et al. | |
| 2010/0115204 A1 | 5/2010 | Li et al. | |
| 2010/0131827 A1 | 5/2010 | Sokolov et al. | |
| 2010/0291867 A1 | 11/2010 | Abdulla et al. | |
| 2010/0293317 A1 | 11/2010 | Confalonieri et al. | |
| 2010/0293420 A1 | 11/2010 | Kapil et al. | |
| 2010/0306446 A1 | 12/2010 | Villa et al. | |
| 2010/0306453 A1 | 12/2010 | Doller | |
| 2010/0318718 A1 | 12/2010 | Eilert et al. | |
| 2010/0332727 A1 | 12/2010 | Kapil et al. | |
| 2011/0016268 A1 | 1/2011 | Qawami et al. | |
| 2011/0051513 A1 | 3/2011 | Shen et al. | |
| 2011/0051744 A1 | 3/2011 | Agarwal | |
| 2011/0072204 A1 | 3/2011 | Chang et al. | |
| 2011/0087824 A1 | 4/2011 | Lin | |
| 2011/0138122 A1 | 6/2011 | Hughes et al. | |
| 2011/0145474 A1 | 6/2011 | Intrater | |
| 2011/0145493 A1 | 6/2011 | Ahn et al. | |
| 2011/0153916 A1 | 6/2011 | Chinnaswamy et al. | |
| 2011/0153963 A1 | 6/2011 | Chen et al. | |
| 2011/0173392 A1 | 7/2011 | Gara et al. | |
| 2011/0185102 A1 * | 7/2011 | Deogharia .......... G06F 13/4059 710/309 | |
| 2011/0197031 A1 | 8/2011 | Aho | |
| 2011/0208900 A1 | 8/2011 | Schuette et al. | |
| 2011/0208910 A1 | 8/2011 | Takada et al. | |
| 2011/0231593 A1 | 9/2011 | Yasufuku | |
| 2011/0291884 A1 | 12/2011 | Oh et al. | |
| 2012/0079232 A1 | 3/2012 | Hinton et al. | |
| 2012/0198140 A1 | 8/2012 | Karamcheti et al. | |
| 2012/0221785 A1 | 8/2012 | Chung et al. | |

(56) References Cited

U.S. PATENT DOCUMENTS

| | | | |
|---|---|---|---|
| 2012/0254507 | A1 | 10/2012 | Chang et al. |
| 2012/0324195 | A1 | 12/2012 | Rabinovitch |
| 2013/0044539 | A1 | 2/2013 | Hirst et al. |
| 2013/0103909 | A1 | 4/2013 | Pangborn |
| 2013/0205065 | A1 | 8/2013 | Kloeppner et al. |
| 2013/0268741 | A1 | 10/2013 | Daly et al. |
| 2013/0282967 | A1 | 10/2013 | Ramanujan |
| 2013/0326583 | A1 | 12/2013 | Freihold |
| 2014/0075107 | A1 | 3/2014 | Qawami et al. |
| 2014/0082260 | A1 | 3/2014 | Oh |
| 2014/0108703 | A1 | 4/2014 | Cohen et al. |
| 2014/0181364 | A1 | 6/2014 | Berke |
| 2014/0237157 | A1 | 8/2014 | Takefman |
| 2014/0281316 | A1* | 9/2014 | Sano .................. G06F 11/1441 711/162 |
| 2014/0372709 | A1 | 12/2014 | Pangborn |
| 2015/0261442 | A1* | 9/2015 | Haywood .......... G06F 13/1673 711/103 |
| 2015/0363106 | A1 | 12/2015 | Lim |
| 2017/0249266 | A1* | 8/2017 | Nale .................. G06F 13/1694 |
| 2017/0286151 | A1* | 10/2017 | Landers ............. G06F 9/45558 |
| 2018/0004432 | A1 | 1/2018 | Dahlen et al. |

FOREIGN PATENT DOCUMENTS

| | | | |
|---|---|---|---|
| CN | 101237546 | A | 8/2008 |
| CN | 101315614 | A | 12/2008 |
| CN | 101496110 | A | 7/2009 |
| CN | 101501779 | A | 8/2009 |
| CN | 101989183 | A | 3/2011 |
| EP | 0210384 | B1 | 2/1987 |
| EP | 0806726 | A1 | 11/1997 |
| EP | 1089185 | A3 | 4/2001 |
| EP | 2278470 | A1 | 1/2011 |
| TW | 583541 | B | 4/2004 |
| TW | 200845014 | A | 11/2008 |
| TW | 200903498 | A | 1/2009 |
| TW | 200912643 | A | 3/2009 |
| TW | M369528 | U1 | 11/2009 |
| TW | 201023193 | | 6/2010 |
| TW | 1327319 | | 7/2010 |
| TW | 201104700 | A | 2/2011 |
| TW | 201106157 | A | 2/2011 |
| TW | 201107974 | A | 3/2011 |
| TW | 201120636 | A | 6/2011 |
| WO | 9950853 | | 10/1999 |
| WO | 2010141650 | A2 | 12/2010 |
| WO | 2012163140 | A1 | 12/2012 |

OTHER PUBLICATIONS

Wu et al., "eNVy: A Non-Volatile, Main Memory Storage System," ASPLOS VI Proceedings of the Sixth International Conference on Architectural Support for Programming Languages and Operating Systems, 12 pages, Oct. 1994. cited by applicant.

"Compressed NVRM bases Memory Systems", 9 pages.

"Phase change memory-based 'moneta' system points to the future of computer storage", ScienceBlog, Jun. 2, 2011, 7 pgs.

"The Non-Volatile Systems Laboratory Coding for non-volatile memories", http://nvsl.ucsd.edu/ecc, printed Sep. 1, 2011. 2 pgs.

"The Non-Volatile Systems Laboratory Moneta and Onyx: Very Fast SS", http://nvsl.ucsd.edu/moneta/, 3 pgs., Sep. 1, 2011.

"The Non-Volatile Systems Laboratory NV-Heaps: Fast and Safe Persistent Objects", http://nvsl.ucsd.edu/nvuheaps/, 2 pgs., Sep. 1, 2011.

Akel et al., "Onyx: A Prototype Phase Change Memory Storage Array",www.flashmemorysummit.com/.../Proceeding_2011/08/11_S301_Akel.pdf, 5 pgs.

Bailey et al., "Operating System Implications of Fast, Cheap, Non-Volatile Memory" 13th USENIX, HOTOS11 2011, May 9-11, 2011, 5 pages.

Caulfield et al., "Moneta: A High-performance Storage Array Architecture for Next-generation, Non-volatile Memories", MICRO 43: Proceedings of the 43rd Annual IEEE/ACM International Symposium on Microarchitecture, Atlanta, GA Dec. 2010 pp. 385-395.

Chen et al., "Rethinking Database Algorithms for Phase Change Memory", 5th Biennial Conference on Innovative Data Systems Research {CIDR '11 }, Jan. 9, 2011, 11 pgs., Asilomar, California, USA.

Condit et al., "Better I/0 Through Byte-Addressable, Persistent Memory", SOSP '09, Oct. 11, 2009, pp. 133-146. Big Sky, Montana, USA.

European Search Report Application No. 11873442.5, dated Apr. 7, 2015, 8 pages. cited by applicant.

Freitas et al., "Storage-class memory: The next storage system technology", IBM J. Res. & Dev., Jul./Sep. 2008, pp. 439-447, vol. 52, No. 4/5.

Jacob et al., "The Memory System You Can't Avoid It, You Can't Ignore It, You Can't Fake It", 2009, 77 pgs., Morgan & Claypool.

Kant, Dr. Krishna, "Exploiting NVRAM for Building Multi-Level Memory Systems", InternationalWorkshop on Operating System Technologies for Large Scale NVRAM, Oct. 21, 2008, Jeju, Korea, 19 pages.

Lee et al., "Architecting Phase Change Memory as a Scalable DRAM Alternative", ISCA '09, Jun. 20, 2009, 12 pgs., Austin, Texas, USA.

Mearian, "IBM announces computer memory breakthrough Phase-change memory offers 100 times the write performance of NANO flash", Jun. 30, 2011, 3 pgs.

Mogul et al., "Operating System Support for NVM+DRAM Hybrid Main Memory", 12th Workshop on Hot Topics in Operating Systems {HatOS XII), May 18, 2009, 9 pgs.

PCT Notification concerning Transmittal of International Preliminary Report on Patentability (Chapter I of the Patent Cooperation Treaty) for PCT Counterpart Application No. PCT/US2011/054421, 6 pgs., (Apr. 10, 2014). cited by applicant.

Quereshi et al., "Scalable High Performance Main Memory System Using Phase-Change Memory Technology", ISCA '09, Jun. 20, 2009, 10 pgs., Austin, Texas, USA.

Raoux et al., "Phase-change random access memory: A scalable technology", IBM J. Res. & Dev., Jul./ Sep. 2008, pp. 465-479, vol. 52, No. 4/5.

The European Search Report Application No. 11873442.5, dated Apr. 7, 2015, 8 pages. cited by applicant.

Extended European Search Report for Patent Application No. 18165216.5, dated Jun. 14, 2018, 9 pages.

Extended European Search Report for Patent Application No. 18165222.3, dated May 28, 2018, 12 pages.

Notice of Allowance for U.S. Appl. No. 15/857,992, dated Jul. 2, 2018, 8 pages.

Notice of Allowance for U.S. Appl. No. 15/857,992, dated Oct. 24, 2018, 7 pages.

Notice of Allowance for U.S. Appl. No. 16/046,587, dated Dec. 19, 2018, 8 pages.

* cited by examiner

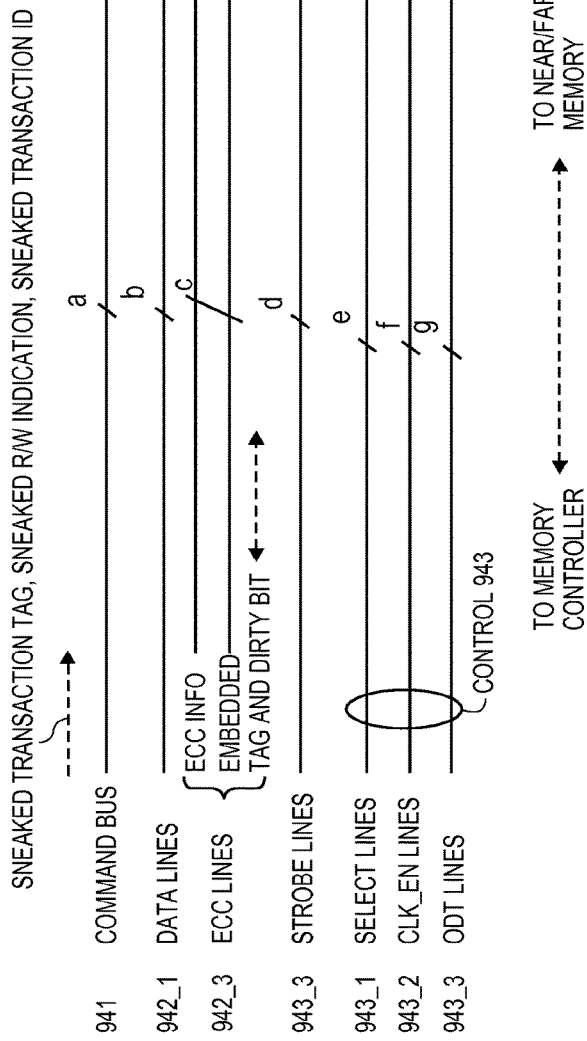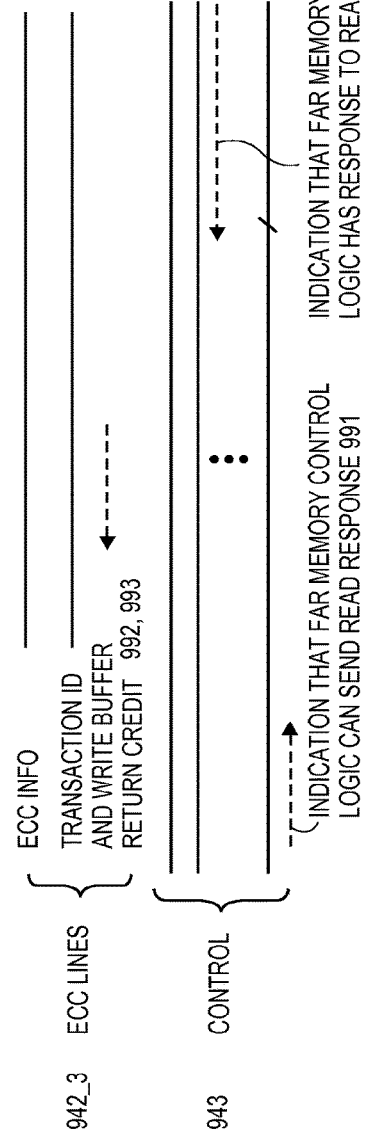

MEMORY CHANNEL THAT SUPPORTS NEAR MEMORY AND FAR MEMORY ACCESS

RELATED CASES

This application is a continuation of and claims the benefit of U.S. patent application Ser. No. 15/081,164, titled "MEMORY CHANNEL THAT SUPPORTS NEAR MEMORY AND FAR MEMORY ACCESS", filed Mar. 25, 2016, which is a divisional of and further claims the benefit of U.S. patent application Ser. No. 13/977,603, titled "MEMORY CHANNEL THAT SUPPORTS NEAR MEMORY AND FAR MEMORY ACCESS", filed Sep. 16, 2013, which further claims the benefit of a 371 International Application No. PCT/US2011/054421, entitled "MEMORY CHANNEL THAT SUPPORTS NEAR MEMORY AND FAR MEMORY ACCESS", filed on Sep. 30, 2011 all of which are incorporated by reference in their entirety.

BACKGROUND

Field of the Invention

This invention relates generally to the field of computer systems. More particularly, the invention relates to an apparatus and method for implementing a multi-level memory hierarchy including a non-volatile memory tier.

Description of the Related Art

A. Current Memory and Storage Configurations

One of the limiting factors for computer innovation today is memory and storage technology. In conventional computer systems, system memory (also known as main memory, primary memory, executable memory) is typically implemented by dynamic random access memory (DRAM). DRAM-based memory consumes power even when no memory reads or writes occur because it must constantly recharge internal capacitors. DRAM-based memory is volatile, which means data stored in DRAM memory is lost once the power is removed. Conventional computer systems also rely on multiple levels of caching to improve performance. A cache is a high speed memory positioned between the processor and system memory to service memory access requests faster than they could be serviced from system memory. Such caches are typically implemented with static random access memory (SRAM). Cache management protocols may be used to ensure that the most frequently accessed data and instructions are stored within one of the levels of cache, thereby reducing the number of memory access transactions and improving performance.

With respect to mass storage (also known as secondary storage or disk storage), conventional mass storage devices typically include magnetic media (e.g., hard disk drives), optical media (e.g., compact disc (CD) drive, digital versatile disc (DVD), etc.), holographic media, and/or mass-storage flash memory (e.g., solid state drives (SSDs), removable flash drives, etc.). Generally, these storage devices are considered Input/Output (I/O) devices because they are accessed by the processor through various I/O adapters that implement various I/O protocols. These I/O adapters and I/O protocols consume a significant amount of power and can have a significant impact on the die area and the form factor of the platform. Portable or mobile devices (e.g., laptops, netbooks, tablet computers, personal digital assistant (PDAs), portable media players, portable gaming devices, digital cameras, mobile phones, smartphones, feature phones, etc.) that have limited battery life when not connected to a permanent power supply may include removable mass storage devices (e.g., Embedded Multimedia Card (eMMC), Secure Digital (SD) card) that are typically coupled to the processor via low-power interconnects and I/O controllers in order to meet active and idle power budgets.

With respect to firmware memory (such as boot memory (also known as BIOS flash)), a conventional computer system typically uses flash memory devices to store persistent system information that is read often but seldom (or never) written to. For example, the initial instructions executed by a processor to initialize key system components during a boot process (Basic Input and Output System (BIOS) images) are typically stored in a flash memory device. Flash memory devices that are currently available in the market generally have limited speed (e.g., 50 MHz). This speed is further reduced by the overhead for read protocols (e.g., 2.5 MHz). In order to speed up the BIOS execution speed, conventional processors generally cache a portion of BIOS code during the Pre-Extensible Firmware Interface (PEI) phase of the boot process. The size of the processor cache places a restriction on the size of the BIOS code used in the PEI phase (also known as the "PEI BIOS code").

B. Phase-Change Memory (PCM) and Related Technologies

Phase-change memory (PCM), also sometimes referred to as phase change random access memory (PRAM or PCRAM), PCME, Ovonic Unified Memory, or Chalcogenide RAM (C-RAM), is a type of non-volatile computer memory which exploits the unique behavior of chalcogenide glass. As a result of heat produced by the passage of an electric current, chalcogenide glass can be switched between two states: crystalline and amorphous. Recent versions of PCM can achieve two additional distinct states.

PCM provides higher performance than flash because the memory element of PCM can be switched more quickly, writing (changing individual bits to either 1 or 0) can be done without the need to first erase an entire block of cells, and degradation from writes is slower (a PCM device may survive approximately 100 million write cycles; PCM degradation is due to thermal expansion during programming, metal (and other material) migration, and other mechanisms).

BRIEF DESCRIPTION OF THE DRAWINGS

The following description and accompanying drawings are used to illustrate embodiments of the invention. In the drawings:

FIG. 9A illustrates application of memory channel wiring to support near memory accesses;

FIG. 9B illustrates application of memory channel wiring to support far memory accesses;

DETAILED DESCRIPTION

Figure 1:
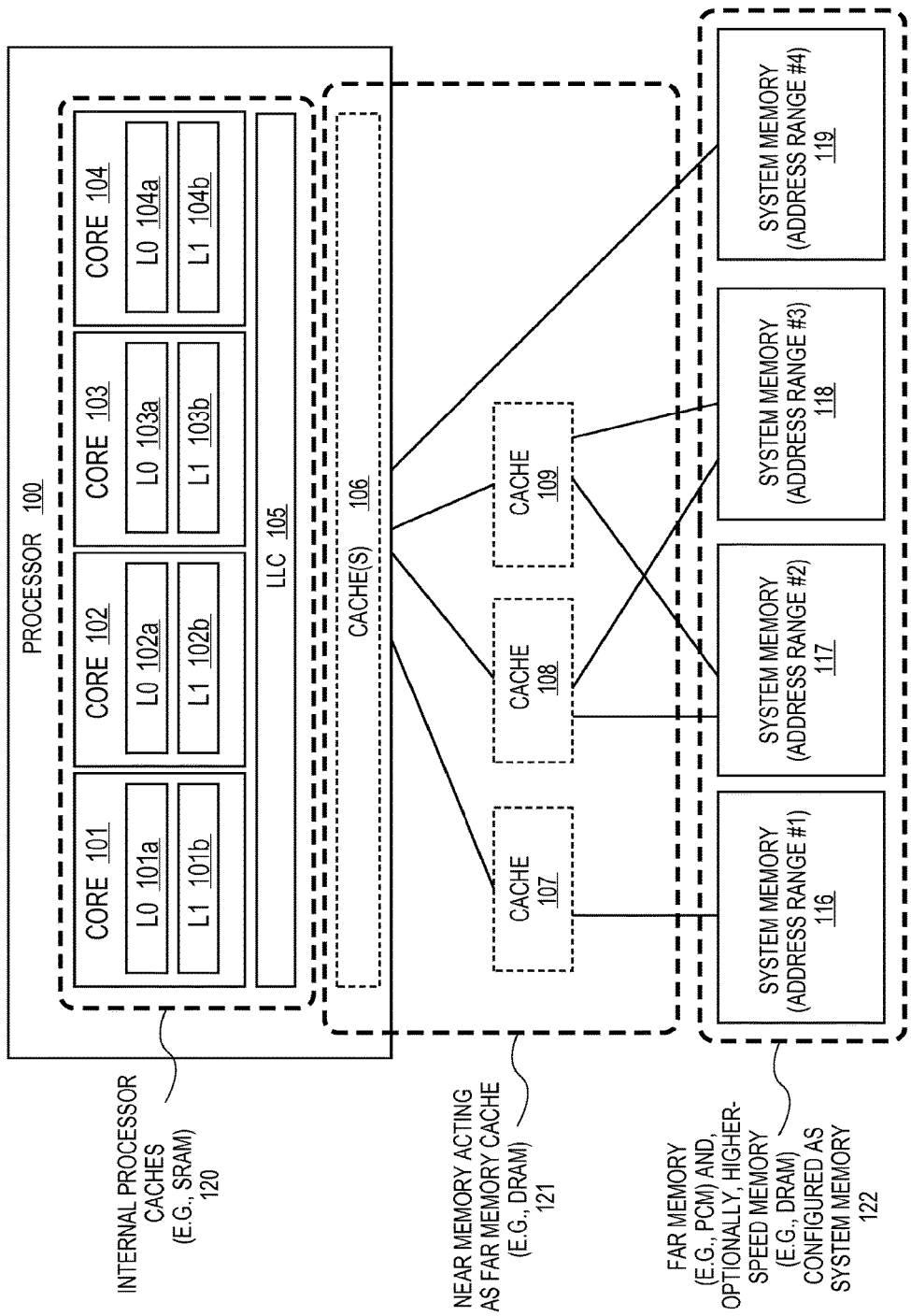
FIG. 1 illustrates a cache and system memory arrangement according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Bracketed text and blocks with dashed borders (e.g., large dashes, small dashes, dot-dash, dots) are sometimes used herein to illustrate optional operations/components that add additional features to embodiments of the invention. However, such notation should not be taken to mean that these are the only options or optional operations/components, and/or that blocks with solid borders are not optional in certain embodiments of the invention.

INTRODUCTION

Memory capacity and performance requirements continue to increase with an increasing number of processor cores and new usage models such as virtualization. In addition, memory power and cost have become a significant component of the overall power and cost, respectively, of electronic systems.

Some embodiments of the invention solve the above challenges by intelligently subdividing the performance requirement and the capacity requirement between memory technologies. The focus of this approach is on providing performance with a relatively small amount of a relatively higher-speed memory such as DRAM while implementing the bulk of the system memory using significantly cheaper and denser non-volatile random access memory (NVRAM). Embodiments of the invention described below define platform configurations that enable hierarchical memory subsystem organizations for the use of NVRAM. The use of NVRAM in the memory hierarchy also enables new usages such as expanded boot space and mass storage implementations, as described in detail below.

FIG. 1 illustrates a cache and system memory arrangement according to embodiments of the invention. Specifically, FIG. 1 shows a memory hierarchy including a set of internal processor caches 120, "near memory" acting as a far memory cache 121, which may include both internal cache(s) 106 and external caches 107-109, and "far memory" 122. One particular type of memory which may be used for "far memory" in some embodiments of the invention is non-volatile random access memory ("NVRAM"). As such, an overview of NVRAM is provided below, followed by an overview of far memory and near memory.

A. Non-Volatile Random Access Memory ("NVRAM")

There are many possible technology choices for NVRAM, including PCM, Phase Change Memory and Switch (PCMS) (the latter being a more specific implementation of the former), byte-addressable persistent memory (BPRAM), storage class memory (SCM), universal memory, Ge2Sb2Te5, programmable metallization cell (PMC), resistive memory (RRAM), RESET (amorphous) cell, SET (crystalline) cell, PCME, Ovshinsky memory, ferroelectric memory (also known as polymer memory and poly(N-vinylcarbazole)), ferromagnetic memory (also known as Spintronics, SPRAM (spin-transfer torque RAM), STRAM (spin tunneling RAM), magnetoresistive memory, magnetic memory, magnetic random access memory (MRAM)), and Semiconductor-oxide-nitride-oxide-semiconductor (SONOS, also known as dielectric memory).

NVRAM has the following characteristics:

(1) It maintains its content even if power is removed, similar to FLASH memory used in solid state disks (SSD), and different from SRAM and DRAM which are volatile;

(2) lower power consumption than volatile memories such as SRAM and DRAM;

(3) random access similar to SRAM and DRAM (also known as randomly addressable);

(4) rewritable and erasable at a lower level of granularity (e.g., byte level) than FLASH found in SSDs (which can only be rewritten and erased a "block" at a time—minimally 64 Kbyte in size for NOR FLASH and 16 Kbyte for NAND FLASH);

(5) used as a system memory and allocated all or a portion of the system memory address space;

(6) capable of being coupled to the processor over a bus using a transactional protocol (a protocol that supports transaction identifiers (IDs) to distinguish different transactions so that those transactions can complete out-of-order) and allowing access at a level of granularity small enough to support operation of the NVRAM as system memory (e.g., cache line size such as 64 or 128 byte). For example, the bus may be a memory bus (e.g., a DDR bus such as DDR3, DDR4, etc.) over which is run a transactional protocol as opposed to the non-transactional protocol that is normally used. As another example, the bus may be one over which is normally run a transactional protocol (a native transactional protocol), such as a PCI express (PCIE) bus, desktop management interface (DMI) bus, or any other type of bus utilizing a transactional protocol and a small enough transaction payload size (e.g., cache line size such as 64 or 128 byte); and (7) one or more of the following:
  a) faster write speed than non-volatile memory/storage technologies such as FLASH;
  b) very high read speed (faster than FLASH and near or equivalent to DRAM read speeds);
  c) directly writable (rather than requiring erasing (overwriting with 1s) before writing data like FLASH memory used in SSDs);
  d) a greater number of writes before failure (more than boot ROM and FLASH used in SSDs); and/or As mentioned above, in contrast to FLASH memory, which must be rewritten and erased a complete "block" at a time, the level of granularity at which NVRAM is accessed in any given implementation may depend on the particular memory controller and the particular memory bus or other type of bus to which the NVRAM is coupled. For example, in some implementations where NVRAM is used as system memory, the NVRAM may be accessed at the granularity of a cache line (e.g., a 64-byte or 128-Byte cache line), notwithstanding an inherent ability to be accessed at the granularity of a byte, because cache line is the level at which the memory subsystem accesses memory. Thus, when NVRAM is deployed within a memory subsystem, it may be accessed at the same level of granularity as the DRAM (e.g., the "near memory") used in the same memory subsystem. Even so, the level of granularity of access to the NVRAM by the memory controller and memory bus or other type of bus is smaller than that of the block size used by Flash and the access size of the I/O subsystem's controller and bus.

NVRAM may also incorporate wear leveling algorithms to account for the fact that the storage cells at the far memory level begin to wear out after a number of write accesses, especially where a significant number of writes may occur such as in a system memory implementation. Since high cycle count blocks are most likely to wear out in this manner, wear leveling spreads writes across the far memory cells by swapping addresses of high cycle count blocks with low cycle count blocks. Note that most address swapping is typically transparent to application programs because it is handled by hardware, lower-level software (e.g., a low level driver or operating system), or a combination of the two.

B. Far Memory

The far memory 122 of some embodiments of the invention is implemented with NVRAM, but is not necessarily limited to any particular memory technology. Far memory 122 is distinguishable from other instruction and data memory/storage technologies in terms of its characteristics and/or its application in the memory/storage hierarchy. For example, far memory 122 is different from:

1) static random access memory (SRAM) which may be used for level 0 and level 1 internal processor caches 101a-b, 102a-b, 103a-b, 103a-b, and 104a-b dedicated to each of the processor cores 101-104, respectively, and lower level cache (LLC) 105 shared by the processor cores;
2) dynamic random access memory (DRAM) configured as a cache 106 internal to the processor 100 (e.g., on the same die as the processor 100) and/or configured as one or more caches 107-109 external to the processor (e.g., in the same or a different package from the processor 100); and
3) FLASH memory/magnetic disk/optical disc applied as mass storage (not shown); and
4) memory such as FLASH memory or other read only memory (ROM) applied as firmware memory (which can refer to boot ROM, BIOS Flash, and/or TPM Flash). (not shown).

Far memory 122 may be used as instruction and data storage that is directly addressable by a processor 100 and is able to sufficiently keep pace with the processor 100 in contrast to FLASH/magnetic disk/optical disc applied as mass storage. Moreover, as discussed above and described in detail below, far memory 122 may be placed on a memory bus and may communicate directly with a memory controller that, in turn, communicates directly with the processor 100.

Far memory 122 may be combined with other instruction and data storage technologies (e.g., DRAM) to form hybrid memories (also known as Co-locating PCM and DRAM; first level memory and second level memory; FLAM (FLASH and DRAM)). Note that at least some of the above technologies, including PCM/PCMS may be used for mass storage instead of, or in addition to, system memory, and need not be random accessible, byte addressable or directly addressable by the processor when applied in this manner.

For convenience of explanation, most of the remainder of the application will refer to "NVRAM" or, more specifically, "PCM," or "PCMS" as the technology selection for the far memory 122. As such, the terms NVRAM, PCM, PCMS, and far memory may be used interchangeably in the following discussion. However it should be realized, as discussed above, that different technologies may also be utilized for far memory. Also, that NVRAM is not limited for use as far memory.

C. Near Memory

"Near memory" 121 is an intermediate level of memory configured in front of a far memory 122 that has lower read/write access latency relative to far memory and/or more symmetric read/write access latency (i.e., having read times which are roughly equivalent to write times). In some embodiments, the near memory 121 has significantly lower write latency than the far memory 122 but similar (e.g., slightly lower or equal) read latency; for instance the near memory 121 may be a volatile memory such as volatile random access memory (VRAM) and may comprise a DRAM or other high speed capacitor-based memory. Note, however, that the underlying principles of the invention are not limited to these specific memory types. Additionally, the near memory 121 may have a relatively lower density and/or may be more expensive to manufacture than the far memory 122.

In one embodiment, near memory 121 is configured between the far memory 122 and the internal processor caches 120. In some of the embodiments described below, near memory 121 is configured as one or more memory-side caches (MSCs) 107-109 to mask the performance and/or usage limitations of the far memory including, for example, read/write latency limitations and memory degradation limitations. In these implementations, the combination of the MSC 107-109 and far memory 122 operates at a performance level which approximates, is equivalent or exceeds a system which uses only DRAM as system memory. As discussed in detail below, although shown as a "cache" in FIG. 1, the near memory 121 may include modes in which it performs other roles, either in addition to, or in lieu of, performing the role of a cache.

Near memory 121 can be located on the processor die (as cache(s) 106) and/or located external to the processor die (as caches 107-109) (e.g., on a separate die located on the CPU package, located outside the CPU package with a high bandwidth link to the CPU package, for example, on a memory dual in-line memory module (DIMM), a riser/mezzanine, or a computer motherboard). The near memory 121 may be coupled in communicate with the processor 100 using a single or multiple high bandwidth links, such as DDR or other transactional high bandwidth links (as described in detail below).

An Exemplary System Memory Allocation Scheme

FIG. 1 illustrates how various levels of caches 101-109 are configured with respect to a system physical address (SPA) space 116-119 in embodiments of the invention. As mentioned, this embodiment comprises a processor 100 having one or more cores 101-104, with each core having its own dedicated upper level cache (L0) 101a-104a and mid-level cache (MLC) (L1) cache 101b-104b. The processor 100 also includes a shared LLC 105. The operation of these various cache levels are well understood and will not be described in detail here.

The caches 107-109 illustrated in FIG. 1 may be dedicated to a particular system memory address range or a set of non-contiguous address ranges. For example, cache 107 is dedicated to acting as an MSC for system memory address range #1 116 and caches 108 and 109 are dedicated to acting as MSCs for non-overlapping portions of system memory address ranges #2 117 and #3 118. The latter implementation may be used for systems in which the SPA space used by the processor 100 is interleaved into an address space used by the caches 107-109 (e.g., when configured as MSCs). In some embodiments, this latter address space is referred to as a memory channel address (MCA) space. In one embodiment, the internal caches 101a-106 perform caching operations for the entire SPA space.

System memory as used herein is memory which is visible to and/or directly addressable by software executed on the processor 100; while the cache memories 101a-109 may operate transparently to the software in the sense that they do not form a directly-addressable portion of the system address space, but the cores may also support execution of instructions to allow software to provide some control (configuration, policies, hints, etc.) to some or all of the cache(s). The subdivision of system memory into regions 116-119 may be performed manually as part of a system configuration process (e.g., by a system designer) and/or may be performed automatically by software.

In one embodiment, the system memory regions 116-119 are implemented using far memory (e.g., PCM) and, in some embodiments, near memory configured as system memory. System memory address range #4 represents an address range which is implemented using a higher speed memory such as DRAM which may be a near memory configured in a system memory mode (as opposed to a caching mode).

Figure 2:
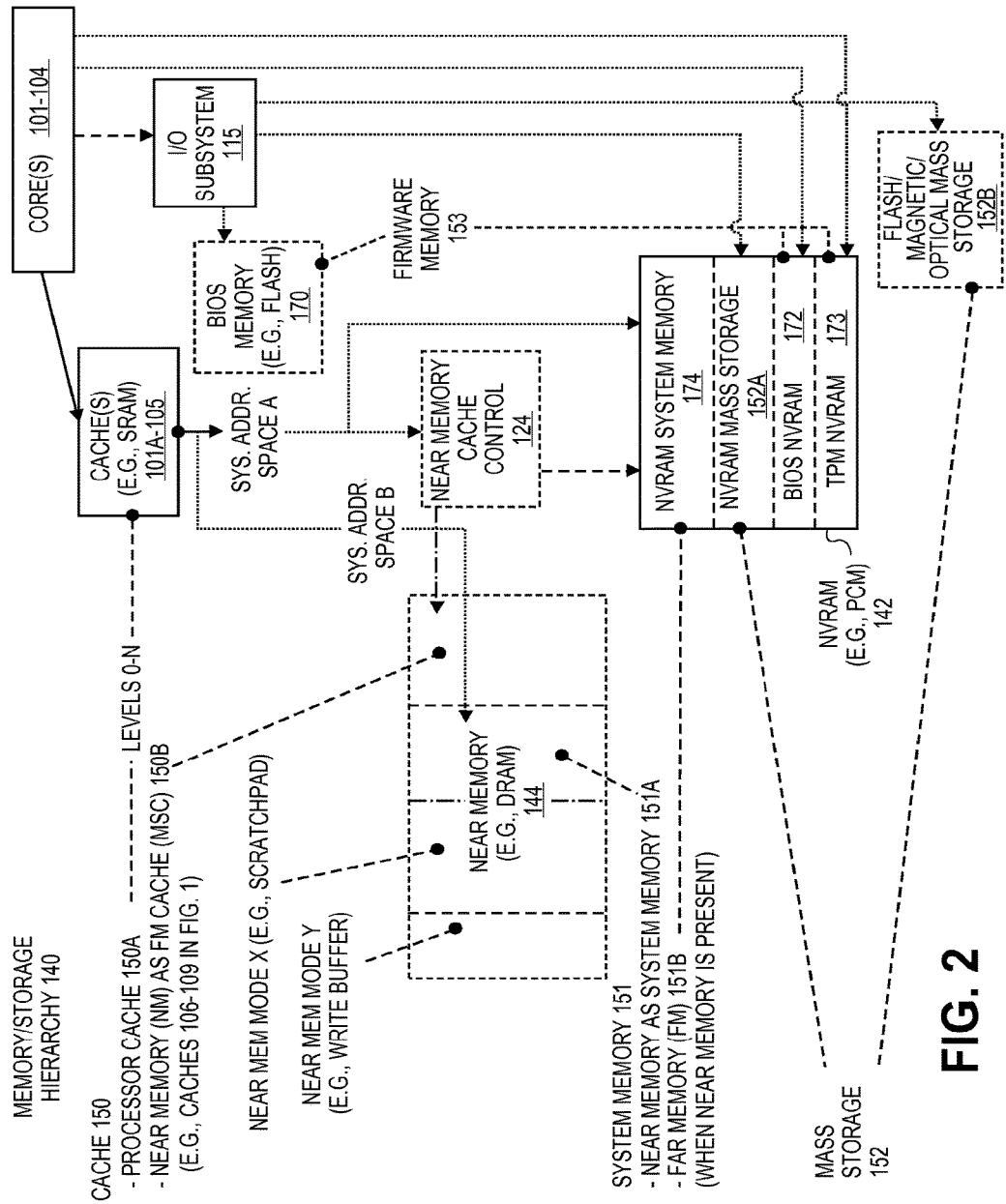
FIG. 2 illustrates a memory and storage hierarchy employed in one embodiment of the invention.

FIG. 2 illustrates a memory/storage hierarchy 140 and different configurable modes of operation for near memory 144 and NVRAM according to embodiments of the invention. The memory/storage hierarchy 140 has multiple levels including (1) a cache level 150 which may include processor caches 150A (e.g., caches 101A-105 in FIG. 1) and optionally near memory as cache for far memory 150B (in certain modes of operation as described herein), (2) a system memory level 151 which may include far memory 151B (e.g., NVRAM such as PCM) when near memory is present (or just NVRAM as system memory 174 when near memory is not present), and optionally near memory operating as system memory 151A (in certain modes of operation as described herein), (3) a mass storage level 152 which may include a flash/magnetic/optical mass storage 152B and/or NVRAM mass storage 152A (e.g., a portion of the NVRAM 142); and (4) a firmware memory level 153 that may include BIOS flash 170 and/or BIOS NVRAM 172 and optionally trusted platform module (TPM) NVRAM 173.

As indicated, near memory 144 may be implemented to operate in a variety of different modes including: a first mode in which it operates as a cache for far memory (near memory as cache for FM 150B); a second mode in which it operates as system memory 151A and occupies a portion of the SPA space (sometimes referred to as near memory "direct access" mode); and one or more additional modes of operation such as a scratchpad memory 192 or as a write buffer 193. In some embodiments of the invention, the near memory is partitionable, where each partition may concurrently operate in a different one of the supported modes; and different embodiments may support configuration of the partitions (e.g., sizes, modes) by hardware (e.g., fuses, pins), firmware, and/or software (e.g., through a set of programmable range registers within the MSC controller 124 within which, for example, may be stored different binary codes to identify each mode and partition).

System address space A 190 in FIG. 2 is used to illustrate operation when near memory is configured as a MSC for far memory 150B. In this configuration, system address space A 190 represents the entire system address space (and system address space B 191 does not exist). Alternatively, system address space B 191 is used to show an implementation when all or a portion of near memory is assigned a portion of the system address space. In this embodiment, system address space B 191 represents the range of the system address space assigned to the near memory 151A and system address space A 190 represents the range of the system address space assigned to NVRAM 174.

In addition, when acting as a cache for far memory 150B, the near memory 144 may operate in various sub-modes under the control of the MSC controller 124. In each of these modes, the near memory address space (NMA) is transparent to software in the sense that the near memory does not form a directly-addressable portion of the system address space. These modes include but are not limited to the following:

(1) Write-Back Caching Mode:

In this mode, all or portions of the near memory acting as a FM cache 150B is used as a cache for the NVRAM far memory (FM) 151B. While in write-back mode, every write operation is directed initially to the near memory as cache for FM 150B (assuming that the cache line to which the write is directed is present in the cache). A corresponding write operation is performed to update the NVRAM FM 151B only when the cache line within the near memory as cache for FM 150B is to be replaced by another cache line (in contrast to write-through mode described below in which each write operation is immediately propagated to the NVRAM FM 151B).

(2) Near Memory Bypass Mode:

In this mode all reads and writes bypass the NM acting as a FM cache 150B and go directly to the NVRAM FM 151B. Such a mode may be used, for example, when an application is not cache friendly or requires data to be committed to persistence at the granularity of a cache line. In one embodiment, the caching performed by the processor caches 150A and the NM acting as a FM cache 150B operate independently of one another. Consequently, data may be cached in the NM acting as a FM cache 150B which is not cached in the processor caches 150A (and which, in some cases, may not be permitted to be cached in the processor caches 150A) and vice versa. Thus, certain data which may be designated as "uncacheable" in the processor caches may be cached within the NM acting as a FM cache 150B.

(3) Near Memory Read-Cache Write Bypass Mode:

This is a variation of the above mode where read caching of the persistent data from NVRAM FM 151B is allowed (i.e., the persistent data is cached in the near memory as cache for far memory 150B for read-only operations). This is useful when most of the persistent data is "Read-Only" and the application usage is cache-friendly.

(4) Near Memory Read-Cache Write-Through Mode:

This is a variation of the near memory read-cache write bypass mode, where in addition to read caching, write-hits are also cached. Every write to the near memory as cache for FM 150B causes a write to the FM 151B. Thus, due to the write-through nature of the cache, cache-line persistence is still guaranteed.

When acting in near memory direct access mode, all or portions of the near memory as system memory 151A are directly visible to software and form part of the SPA space. Such memory may be completely under software control. Such a scheme may create a non-uniform memory address (NUMA) memory domain for software where it gets higher performance from near memory 144 relative to NVRAM system memory 174. By way of example, and not limitation, such a usage may be employed for certain high performance computing (HPC) and graphics applications which require very fast access to certain data structures.

In an alternate embodiment, the near memory direct access mode is implemented by "pinning" certain cache lines in near memory (i.e., cache lines which have data that is also concurrently stored in NVRAM 142). Such pinning may be done effectively in larger, multi-way, set-associative caches.

FIG. 2 also illustrates that a portion of the NVRAM 142 may be used as firmware memory. For example, the BIOS NVRAM 172 portion may be used to store BIOS images (instead of or in addition to storing the BIOS information in BIOS flash 170). The BIOS NVRAM portion 172 may be a portion of the SPA space and is directly addressable by software executed on the processor cores 101-104, whereas the BIOS flash 170 is addressable through the I/O subsystem 115. As another example, a trusted platform module (TPM) NVRAM 173 portion may be used to protect sensitive system information (e.g., encryption keys).

Thus, as indicated, the NVRAM 142 may be implemented to operate in a variety of different modes, including as far memory 151B (e.g., when near memory 144 is present/operating, whether the near memory is acting as a cache for the FM via a MSC control 124 or not (accessed directly after cache(s) 101A-105 and without MSC control 124)); just NVRAM system memory 174 (not as far memory because there is no near memory present/operating; and accessed without MSC control 124); NVRAM mass storage 152A; BIOS NVRAM 172; and TPM NVRAM 173. While different embodiments may specify the NVRAM modes in different ways, FIG. 3 describes the use of a decode table 333.

Figure 3:
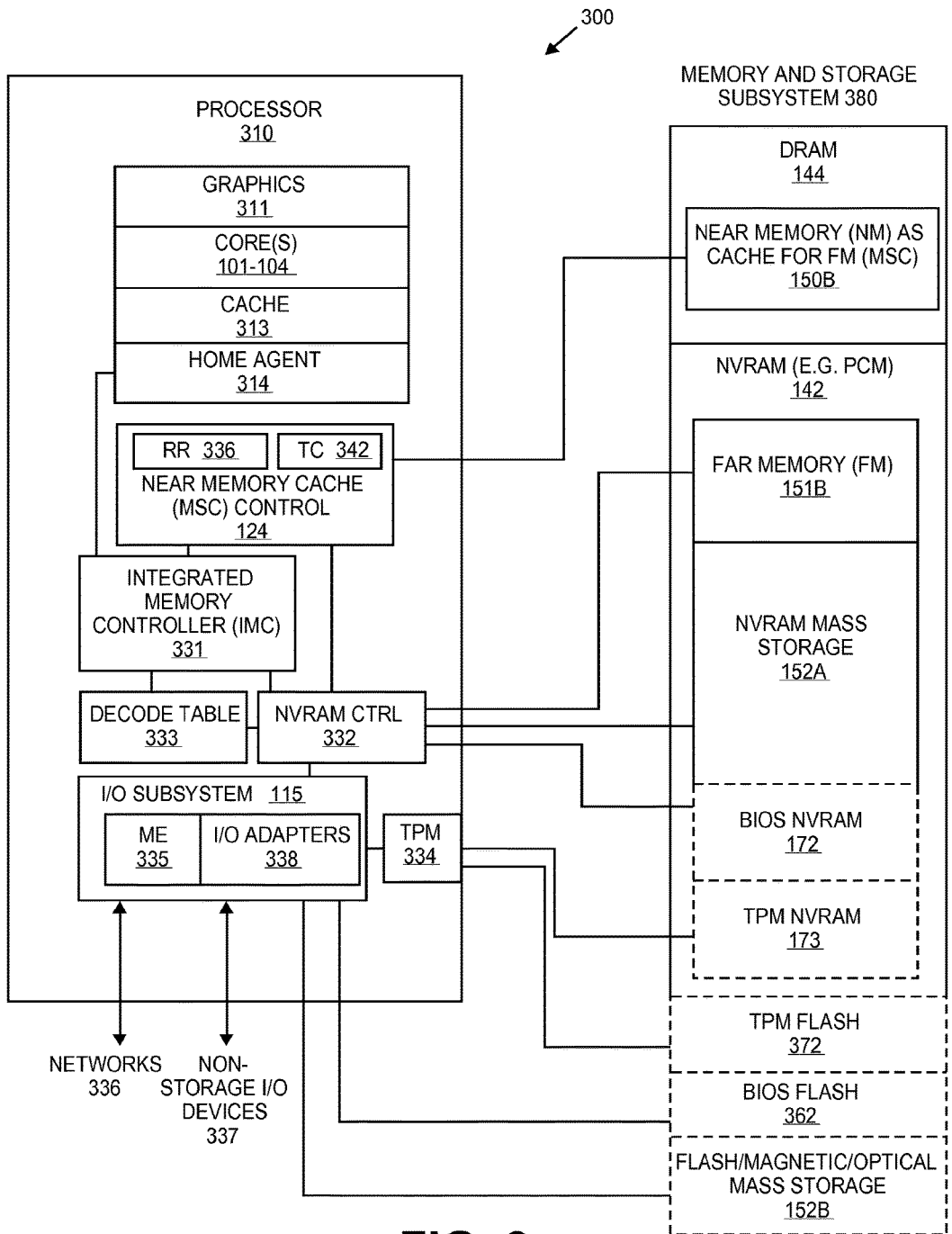
FIG. 3 illustrates a computer system on which embodiments of the invention may be implemented.

FIG. 3 illustrates an exemplary computer system 300 on which embodiments of the invention may be implemented. The computer system 300 includes a processor 310 and memory/storage subsystem 380 with a NVRAM 142 used for both system memory, mass storage, and optionally firmware memory. In one embodiment, the NVRAM 142 comprises the entire system memory and storage hierarchy used by computer system 300 for storing data, instructions, states, and other persistent and non-persistent information. As previously discussed, NVRAM 142 can be configured to implement the roles in a typical memory and storage hierarchy of system memory, mass storage, and firmware memory, TPM memory, and the like. In the embodiment of FIG. 3, NVRAM 142 is partitioned into FM 151B, NVRAM mass storage 152A, BIOS NVRAM 173, and TMP NVRAM 173. Storage hierarchies with different roles are also contemplated and the application of NVRAM 142 is not limited to the roles described above.

By way of example, operation while the near memory as cache for FM 150B is in the write-back caching is described. In one embodiment, while the near memory as cache for FM 150B is in the write-back caching mode mentioned above, a read operation will first arrive at the MSC controller 124 which will perform a look-up to determine if the requested data is present in the near memory acting as a cache for FM 150B (e.g., utilizing a tag cache 342). If present, it will return the data to the requesting CPU, core 101-104 or I/O device through I/O subsystem 115. If the data is not present, the MSC controller 124 will send the request along with the system memory address to an NVRAM controller 332. The NVRAM controller 332 will use the decode table 333 to translate the system memory address to an NVRAM physical device address (PDA) and direct the read operation to this region of the far memory 151B. In one embodiment, the decode table 333 includes an address indirection table (AIT) component which the NVRAM controller 332 uses to translate between system memory addresses and NVRAM PDAs. In one embodiment, the AIT is updated as part of the wear leveling algorithm implemented to distribute memory access operations and thereby reduce wear on the NVRAM FM 151B. Alternatively, the AIT may be a separate table stored within the NVRAM controller 332.

Upon receiving the requested data from the NVRAM FM 151B, the NVRAM controller 332 will return the requested data to the MSC controller 124 which will store the data in the MSC near memory acting as an FM cache 150B and also send the data to the requesting processor core 101-104, or I/O Device through I/O subsystem 115. Subsequent requests for this data may be serviced directly from the near memory acting as a FM cache 150B until it is replaced by some other NVRAM FM data.

As mentioned, in one embodiment, a memory write operation also first goes to the MSC controller 124 which writes it into the MSC near memory acting as a FM cache 150B. In write-back caching mode, the data may not be sent directly to the NVRAM FM 151B when a write operation is received. For example, the data may be sent to the NVRAM FM 151B only when the location in the MSC near memory acting as a FM cache 150B in which the data is stored must be re-used for storing data for a different system memory address. When this happens, the MSC controller 124 notices that the data is not current in NVRAM FM 151B and will thus retrieve it from near memory acting as a FM cache 150B and send it to the NVRAM controller 332. The NVRAM controller 332 looks up the PDA for the system memory address and then writes the data to the NVRAM FM 151B.

In FIG. 3, the NVRAM controller 332 is shown connected to the FM 151B, NVRAM mass storage 152A, and BIOS NVRAM 172 using three separate lines. This does not necessarily mean, however, that there are three separate physical buses or communication channels connecting the NVRAM controller 332 to these portions of the NVRAM 142. Rather, in some embodiments, a common memory bus or other type of bus (such as those described below with respect to FIGS. 4A-M) is used to communicatively couple the NVRAM controller 332 to the FM 151B, NVRAM mass storage 152A, and BIOS NVRAM 172. For example, in one embodiment, the three lines in FIG. 3 represent a bus, such as a memory bus (e.g., a DDR3, DDR4, etc, bus), over which the NVRAM controller 332 implements a transactional protocol to communicate with the NVRAM 142. The NVRAM controller 332 may also communicate with the NVRAM 142 over a bus supporting a native transactional protocol such as a PCI express bus, desktop management interface (DMI) bus, or any other type of bus utilizing a transactional protocol and a small enough transaction payload size (e.g., cache line size such as 64 or 128 byte).

In one embodiment, computer system 300 includes integrated memory controller (IMC) 331 which performs the central memory access control for processor 310, which is coupled to: 1) a memory-side cache (MSC) controller 124 to control access to near memory (NM) acting as a far memory cache 150B; and 2) a NVRAM controller 332 to control access to NVRAM 142. Although illustrated as separate units in FIG. 3, the MSC controller 124 and NVRAM controller 332 may logically form part of the IMC 331.

In the illustrated embodiment, the MSC controller 124 includes a set of range registers 336 which specify the mode of operation in use for the NM acting as a far memory cache 150B (e.g., write-back caching mode, near memory bypass mode, etc, described above). In the illustrated embodiment, DRAM 144 is used as the memory technology for the NM acting as cache for far memory 150B. In response to a memory access request, the MSC controller 124 may determine (depending on the mode of operation specified in the range registers 336) whether the request can be serviced from the NM acting as cache for FM 150B or whether the request must be sent to the NVRAM controller 332, which may then service the request from the far memory (FM) portion 151B of the NVRAM 142.

In an embodiment where NVRAM 142 is implemented with PCMS, NVRAM controller 332 is a PCMS controller that performs access with protocols consistent with the PCMS technology. As previously discussed, the PCMS memory is inherently capable of being accessed at the granularity of a byte. Nonetheless, the NVRAM controller 332 may access a PCMS-based far memory 151B at a lower level of granularity such as a cache line (e.g., a 64-bit or 128-bit cache line) or any other level of granularity consistent with the memory subsystem. The underlying principles of the invention are not limited to any particular level of granularity for accessing a PCMS-based far memory 151B. In general, however, when PCMS-based far memory 151B is used to form part of the system address space, the level of granularity will be higher than that traditionally used for other non-volatile storage technologies such as FLASH, which can only perform rewrite and erase operations at the level of a "block" (minimally 64 Kbyte in size for NOR FLASH and 16 Kbyte for NAND FLASH).

In the illustrated embodiment, NVRAM controller 332 can read configuration data to establish the previously described modes, sizes, etc. for the NVRAM 142 from decode table 333, or alternatively, can rely on the decoding results passed from IMC 331 and I/O subsystem 315. For example, at either manufacturing time or in the field, computer system 300 can program decode table 333 to mark different regions of NVRAM 142 as system memory, mass storage exposed via SATA interfaces, mass storage exposed via USB Bulk Only Transport (BOT) interfaces, encrypted storage that supports TPM storage, among others. The means by which access is steered to different partitions of NVRAM device 142 is via a decode logic. For example, in one embodiment, the address range of each partition is defined in the decode table 333. In one embodiment, when IMC 331 receives an access request, the target address of the request is decoded to reveal whether the request is directed toward memory, NVRAM mass storage, or I/O. If it is a memory request, IMC 331 and/or the MSC controller 124 further determines from the target address whether the request is directed to NM as cache for FM 150B or to FM 151B. For FM 151B access, the request is forwarded to NVRAM controller 332. IMC 331 passes the request to the I/O subsystem 115 if this request is directed to I/O (e.g., non-storage and storage I/O devices). I/O subsystem 115 further decodes the address to determine whether the address points to NVRAM mass storage 152A, BIOS NVRAM 172, or other non-storage or storage I/O devices. If this address points to NVRAM mass storage 152A or BIOS NVRAM 172, I/O subsystem 115 forwards the request to NVRAM controller 332. If this address points to TMP NVRAM 173, I/O subsystem 115 passes the request to TPM 334 to perform secured access.

In one embodiment, each request forwarded to NVRAM controller 332 is accompanied with an attribute (also known as a "transaction type") to indicate the type of access. In one embodiment, NVRAM controller 332 may emulate the access protocol for the requested access type, such that the rest of the platform remains unaware of the multiple roles performed by NVRAM 142 in the memory and storage hierarchy. In alternative embodiments, NVRAM controller 332 may perform memory access to NVRAM 142 regardless of which transaction type it is. It is understood that the decode path can be different from what is described above. For example, IMC 331 may decode the target address of an access request and determine whether it is directed to NVRAM 142. If it is directed to NVRAM 142, IMC 331 generates an attribute according to decode table 333. Based on the attribute, IMC 331 then forwards the request to appropriate downstream logic (e.g., NVRAM controller 332 and I/O subsystem 315) to perform the requested data access. In yet another embodiment, NVRAM controller 332 may decode the target address if the corresponding attribute is not passed on from the upstream logic (e.g., IMC 331 and I/O subsystem 315). Other decode paths may also be implemented.

The presence of a new memory architecture such as described herein provides for a wealth of new possibilities. Although discussed at much greater length further below, some of these possibilities are quickly highlighted immediately below.

According to one possible implementation, NVRAM 142 acts as a total replacement or supplement for traditional DRAM technology in system memory. In one embodiment, NVRAM 142 represents the introduction of a second-level system memory (e.g., the system memory may be viewed as having a first level system memory comprising near memory as cache 150B (part of the DRAM device 340) and a second level system memory comprising far memory (FM) 151B (part of the NVRAM 142).

According to some embodiments, NVRAM 142 acts as a total replacement or supplement for the flash/magnetic/optical mass storage 152B. As previously described, in some embodiments, even though the NVRAM 152A is capable of byte-level addressability, NVRAM controller 332 may still access NVRAM mass storage 152A in blocks of multiple bytes, depending on the implementation (e.g., 64 Kbytes, 128 Kbytes, etc.). The specific manner in which data is accessed from NVRAM mass storage 152A by NVRAM controller 332 may be transparent to software executed by the processor 310. For example, even through NVRAM mass storage 152A may be accessed differently from Flash/magnetic/optical mass storage 152A, the operating system may still view NVRAM mass storage 152A as a standard mass storage device (e.g., a serial ATA hard drive or other standard form of mass storage device).

In an embodiment where NVRAM mass storage 152A acts as a total replacement for the flash/magnetic/optical mass storage 152B, it is not necessary to use storage drivers for block-addressable storage access. The removal of storage driver overhead from storage access can increase access speed and save power. In alternative embodiments where it is desired that NVRAM mass storage 152A appears to the OS and/or applications as block-accessible and indistinguishable from flash/magnetic/optical mass storage 152B, emulated storage drivers can be used to expose block-accessible interfaces (e.g., Universal Serial Bus (USB) Bulk-Only Transfer (BOT), 1.0; Serial Advanced Technology Attachment (SATA), 3.0; and the like) to the software for accessing NVRAM mass storage 152A.

In one embodiment, NVRAM 142 acts as a total replacement or supplement for firmware memory such as BIOS flash 362 and TPM flash 372 (illustrated with dotted lines in FIG. 3 to indicate that they are optional). For example, the NVRAM 142 may include a BIOS NVRAM 172 portion to supplement or replace the BIOS flash 362 and may include a TPM NVRAM 173 portion to supplement or replace the TPM flash 372. Firmware memory can also store system persistent states used by a TPM 334 to protect sensitive system information (e.g., encryption keys). In one embodiment, the use of NVRAM 142 for firmware memory removes the need for third party flash parts to store code and data that are critical to the system operations.

Continuing then with a discussion of the system of FIG. 3, in some embodiments, the architecture of computer system 100 may include multiple processors, although a single processor 310 is illustrated in FIG. 3 for simplicity. Processor 310 may be any type of data processor including a general purpose or special purpose central processing unit (CPU), an application-specific integrated circuit (ASIC) or a digital signal processor (DSP). For example, processor 310 may be a general-purpose processor, such as a Core™ i3, i5, i7, 2 Duo and Quad, Xeon™, or Itanium™ processor, all of which are available from Intel Corporation, of Santa Clara, Calif. Alternatively, processor 310 may be from another company, such as ARM Holdings, Ltd, of Sunnyvale, Calif., MIPS Technologies of Sunnyvale, Calif., etc. Processor 310 may be a special-purpose processor, such as, for example, a network or communication processor, compression engine, graphics processor, co-processor, embedded processor, or the like. Processor 310 may be implemented on one or more chips included within one or more packages. Processor 310 may be a part of and/or may be implemented on one or more substrates using any of a number of process technologies, such as, for example, BiCMOS, CMOS, or NMOS. In the embodiment shown in FIG. 3, processor 310 has a system-on-a-chip (SOC) configuration.

In one embodiment, the processor 310 includes an integrated graphics unit 311 which includes logic for executing graphics commands such as 3D or 2D graphics commands. While the embodiments of the invention are not limited to any particular integrated graphics unit 311, in one embodiment, the graphics unit 311 is capable of executing industry standard graphics commands such as those specified by the Open GL and/or Direct X application programming interfaces (APIs) (e.g., OpenGL 4.1 and Direct X 11).

The processor 310 may also include one or more cores 101-104, although a single core is illustrated in FIG. 3, again, for the sake of clarity. In many embodiments, the core(s) 101-104 includes internal functional blocks such as one or more execution units, retirement units, a set of general purpose and specific registers, etc. If the core(s) are multi-threaded or hyper-threaded, then each hardware thread may be considered as a "logical" core as well. The cores 101-104 may be homogenous or heterogeneous in terms of architecture and/or instruction set. For example, some of the cores may be in order while others are out-of-order. As another example, two or more of the cores may be capable of executing the same instruction set, while others may be capable of executing only a subset of that instruction set or a different instruction set.

The processor 310 may also include one or more caches, such as cache 313 which may be implemented as a SRAM and/or a DRAM. In many embodiments that are not shown, additional caches other than cache 313 are implemented so that multiple levels of cache exist between the execution units in the core(s) 101-104 and memory devices 150B and 151B. For example, the set of shared cache units may include an upper-level cache, such as a level 1 (L1) cache, mid-level caches, such as level 2 (L2), level 3 (L3), level 4 (L4), or other levels of cache, an (LLC), and/or different combinations thereof. In different embodiments, cache 313 may be apportioned in different ways and may be one of many different sizes in different embodiments. For example, cache 313 may be an 8 megabyte (MB) cache, a 16 MB cache, etc. Additionally, in different embodiments the cache may be a direct mapped cache, a fully associative cache, a multi-way set-associative cache, or a cache with another type of mapping. In other embodiments that include multiple cores, cache 313 may include one large portion shared among all cores or may be divided into several separately functional slices (e.g., one slice for each core). Cache 313 may also include one portion shared among all cores and several other portions that are separate functional slices per core.

The processor 310 may also include a home agent 314 which includes those components coordinating and operating core(s) 101-104. The home agent unit 314 may include, for example, a power control unit (PCU) and a display unit. The PCU may be or include logic and components needed for regulating the power state of the core(s) 101-104 and the integrated graphics unit 311. The display unit is for driving one or more externally connected displays.

As mentioned, in some embodiments, processor 310 includes an integrated memory controller (IMC) 331, near memory cache (MSC) controller, and NVRAM controller 332 all of which can be on the same chip as processor 310, or on a separate chip and/or package connected to processor 310. DRAM device 144 may be on the same chip or a different chip as the IMC 331 and MSC controller 124; thus, one chip may have processor 310 and DRAM device 144; one chip may have the processor 310 and another the DRAM device 144 and (these chips may be in the same or different packages); one chip may have the core(s) 101-104 and another the IMC 331, MSC controller 124 and DRAM 144 (these chips may be in the same or different packages); one chip may have the core(s) 101-104, another the IMC 331 and MSC controller 124, and another the DRAM 144 (these chips may be in the same or different packages); etc.

In some embodiments, processor 310 includes an I/O subsystem 115 coupled to IMC 331. I/O subsystem 115 enables communication between processor 310 and the following serial or parallel I/O devices: one or more networks 336 (such as a Local Area Network, Wide Area Network or the Internet), storage I/O device (such as flash/magnetic/optical mass storage 152B, BIOS flash 362, TPM flash 372) and one or more non-storage I/O devices 337 (such as display, keyboard, speaker, and the like). I/O subsystem 115 may include a platform controller hub (PCH) (not shown) that further includes several I/O adapters 338 and other I/O circuitry to provide access to the storage and non-storage I/O devices and networks. To accomplish this, I/O subsystem 115 may have at least one integrated I/O adapter 338 for each I/O protocol utilized. I/O subsystem 115 can be on the same chip as processor 310, or on a separate chip and/or package connected to processor 310.

I/O adapters 338 translate a host communication protocol utilized within the processor 310 to a protocol compatible with particular I/O devices. For flash/magnetic/optical mass storage 152B, some of the protocols that I/O adapters 338 may translate include Peripheral Component Interconnect (PCI)-Express (PCI-E), 3.0; USB, 3.0; SATA, 3.0; Small Computer System Interface (SCSI), Ultra-640; and Institute of Electrical and Electronics Engineers (IEEE) 1394 "Firewire;" among others. For BIOS flash 362, some of the protocols that I/O adapters 338 may translate include Serial Peripheral Interface (SPI), Microwire, among others. Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

In some embodiments, the I/O subsystem 115 is coupled to a TPM control 334 to control access to system persistent states, such as secure data, encryption keys, platform configuration information and the like. In one embodiment, these system persistent states are stored in a TMP NVRAM 173 and accessed via NVRAM controller 332.

In one embodiment, TPM 334 is a secure micro-controller with cryptographic functionalities. TPM 334 has a number of trust-related capabilities; e.g., a SEAL capability for ensuring that data protected by a TPM is only available for the same TPM. TPM 334 can protect data and keys (e.g., secrets) using its encryption capabilities. In one embodiment, TPM 334 has a unique and secret RSA key, which allows it to authenticate hardware devices and platforms. For example, TPM 334 can verify that a system seeking access to data stored in computer system 300 is the expected system. TPM 334 is also capable of reporting the integrity of the platform (e.g., computer system 300). This allows an external resource (e.g., a server on a network) to determine the trustworthiness of the platform but does not prevent access to the platform by the user.

In some embodiments, I/O subsystem 315 also includes a Management Engine (ME) 335, which is a microprocessor that allows a system administrator to monitor, maintain, update, upgrade, and repair computer system 300. In one embodiment, a system administrator can remotely configure computer system 300 by editing the contents of the decode table 333 through ME 335 via networks 336.

For convenience of explanation, the remainder of the application sometimes refers to NVRAM 142 as a PCMS device. A PCMS device includes multi-layered (vertically stacked) PCM cell arrays that are non-volatile, have low power consumption, and are modifiable at the bit level. As such, the terms NVRAM device and PCMS device may be used interchangeably in the following discussion. However it should be realized, as discussed above, that different technologies besides PCMS may also be utilized for NVRAM 142.

It should be understood that a computer system can utilize NVRAM 142 for system memory, mass storage, firmware memory and/or other memory and storage purposes even if the processor of that computer system does not have all of the above-described components of processor 310, or has more components than processor 310.

In the particular embodiment shown in FIG. 3, the MSC controller 124 and NVRAM controller 332 are located on the same die or package (referred to as the CPU package) as the processor 310. In other embodiments, the MSC controller 124 and/or NVRAM controller 332 may be located off-die or off-CPU package, coupled to the processor 310 or CPU package over a bus such as a memory bus (like a DDR bus (e.g., a DDR3, DDR4, etc)), a PCI express bus, a desktop management interface (DMI) bus, or any other type of bus.

Implementation of Near Memory as Caching Layer for Far Memory

As discussed above, in various configurations, near memory can be configured as a caching layer for far memory. Here, specific far memory storage devices (e.g., specific installed PCMS memory chips) may be reserved for specific (e.g., a specific range of) system memory addresses. As such, specific near memory storage devices (e.g., specific installed DRAM memory chips) may be designed to act as a caching layer for the specific far memory storage devices. Accordingly, these specific near memory storage devices should have the effect of reducing the access times of the most frequently accessed system memory addresses that the specific far memory storage devices are designed to provide storage for.

Figure 4:
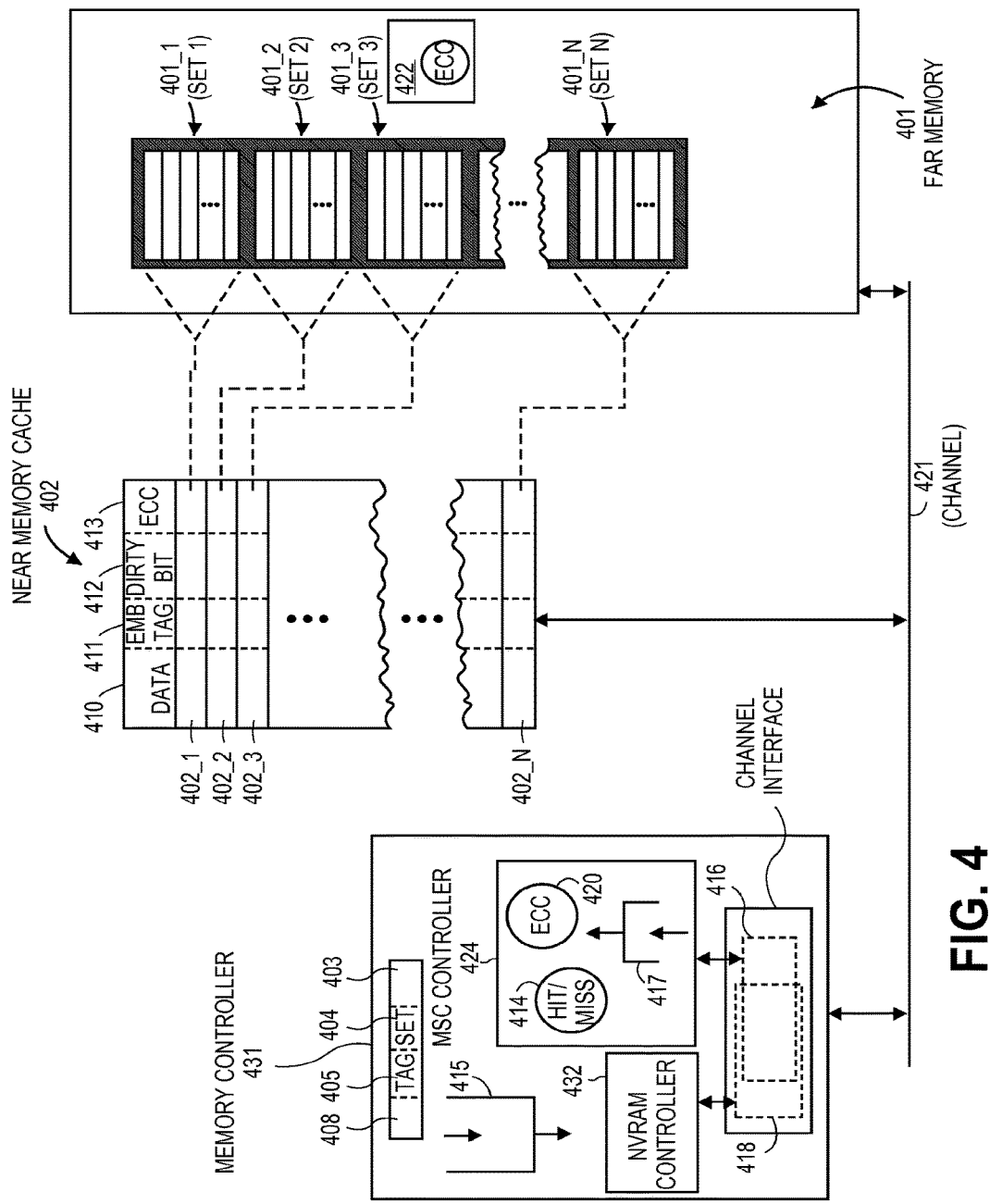
FIG. 4 illustrates an implementation of near memory cache and far memory on a same memory channel.

According to a further approach, observed in FIG. 4, the near memory devices are configured as a direct mapped cache for their far memory counterparts. As is well understood in the art, a direct mapped cache is designed such that each entry in the cache is reserved for a unique set of entries in the deeper storage. That is, in this case, the storage space of the far memory 401 can be viewed as being broken down into different storage sets 401_1, 401_2, . . . 401_N, where, each set is allocated an entry in the cache 402. As such, as observed in FIG. 4, entry 402_1 is reserved for any of the system memory addresses associated with set 401_1; entry 402_2 is reserved for any of the system memory addresses associated with set 401_2, etc. Generally, any of the structural "logic blocks" that appear in FIG. 4, as well as any of FIGS. 7a, 8a and 11 may be largely, if not entirely, implemented with logic circuitry.

FIG. 4 also shows a portion of an exemplary system memory address that may be provided, for instance, from a CPU processing core for a read or write transaction to or from system memoryEssentially, a group of set bits 404 define which set the system memory address is associated with, and, a group of tag bits 405 define which entry in the appropriate set (which may correspond to a cache line) the system memory address corresponds to. Lower ordered bits 403 identify a specific byte within a cache line.

For example, according to one exemplary implementation, the cache line size is 64 bytes, cache 402 is implemented with approximately 1 Gigabyte (GB) of DRAM storage and far memory storage 401 is implemented with approximately 16 Gigabytes (GB) of PCMS storage. Address portions 405, 404 and 403 correspond to 34 bits of address space A[33:0]. Here, lower ordered bits 403 correspond to address bits A[5:0], set address bits 404 correspond to address bits A[29:6] and tag address bits 405 correspond to address bits A[33:30].

From this arrangement, note that the four tag bits 405 specify a value within a range of 1 to 16 which corresponds to the ratio of DRAM storage to PCMS storage. As such, each entry in cache 402 will map to (i.e., provide cacheable support across) sixteen different far memory 401 cache lines. This arrangement essentially defines the size of each set in far memory 401 (16 cache lines per set). The number of sets, which corresponds to the number of entries in cache 402, is defined by set bits 404. In this example, set bits 404 corresponds to 24 bits of address space (address bits A[29:6]) which, in turn, corresponds to 16,777,216 cache entries/sets. A 64 byte cache line therefore corresponds to approximately 1 GB of storage within cache 402 (16,777,216×64 bytes=1,073,741,824 bytes).

If the size of the cache 402 were doubled to include 2 GB of DRAM, there would be eight cache lines per set (instead of sixteen) because the DRAM:PCMS ratio would double to 2:16=1:8. As such the tag 405 would be expressed with three bits (A[33:31]) instead of four bits. The doubling of the DRAM space is further accounted for by providing an additional most significant bit to set bits 404 (i.e., address bits A[30:6] instead of A[29:6]), which, essentially doubles the number of sets.

The far memory storage 401 observed in FIG. 4 may correspond to only a subset of the computer system's total far memory storage. For example, a complete system memory for a computing system may be realized by incorporating multiple instances of the near/far memory subsystem observed in FIG. 4 (e.g., one instance for each unique subset of system memory addresses). Here, according to one approach, higher ordered bits 408 are used to indicate which specific instance amongst the multiple near/far memory subsystems apply for a given system memory access. For example, if each instance corresponds to a different memory channel that stems from a host side 409 (or, more generally, a host), higher ordered bits 408 would effectively specify the applicable memory channel. In an alternate approach, referred to as a "permuted" addressing approach, higher order bits 408 are not present. Rather, bits 405 represent the highest ordered bits and bits within lowest ordered bit space 403 are used to determine which memory channel is to be utilized for the address. This approach is thought to give better system performance by effectively introducing more randomization into the specific memory channels that are utilized over time. Address bits can be in any order.

Figures 5, 6:
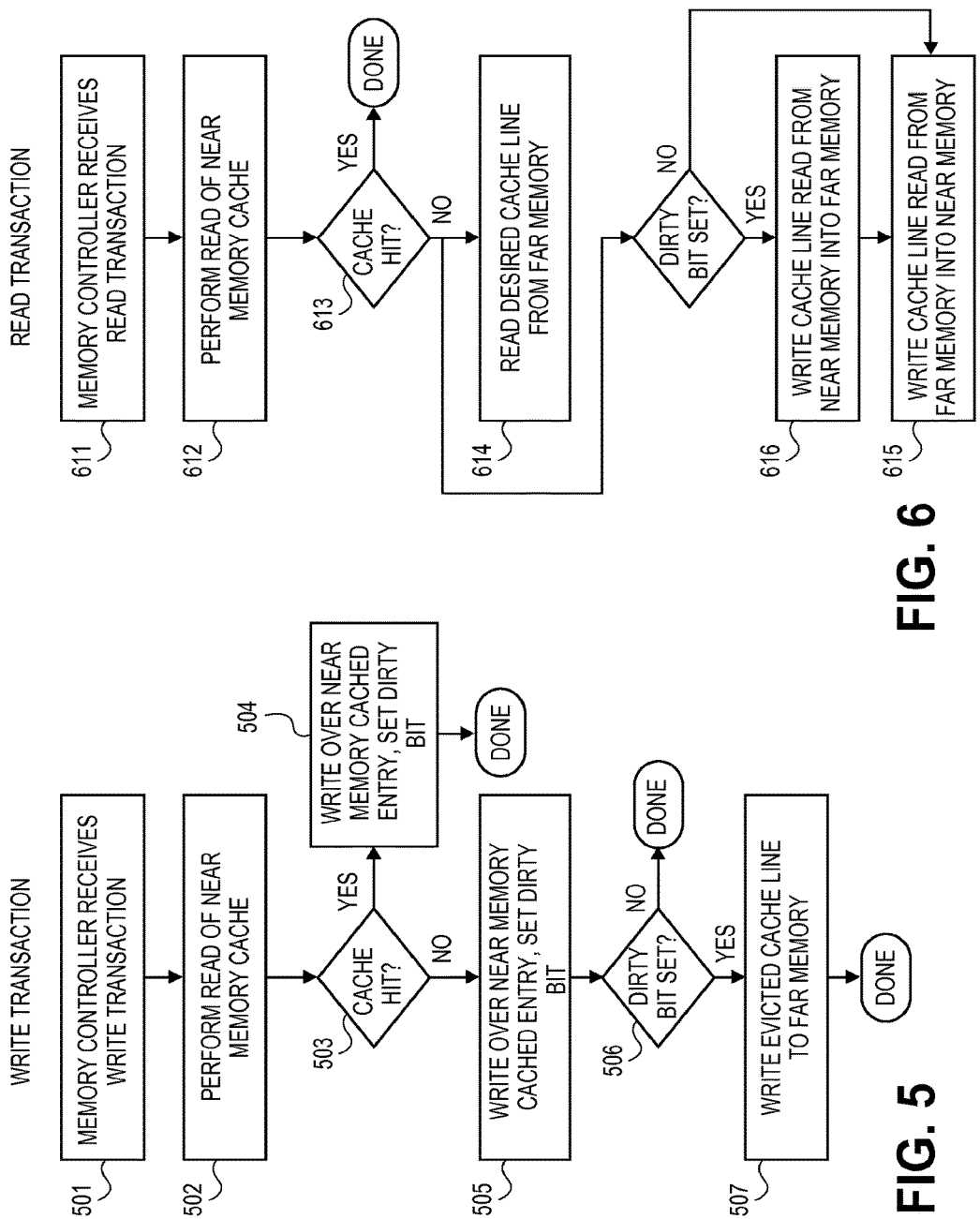
FIG. 5 illustrates a write process that can be performed on the near memory/far memory system observed in FIG. 4.
FIG. 6 illustrates a read process that can be performed on the near memory/far memory system observed in FIG. 4.

FIG. 5 (write) and FIG. 6 (read) depict possible operation schemes of the near/far memory subsystem of FIG. 4. Referring to FIG. 4 and FIG. 5, for write operations, an integrated memory controller 431 receives a write transaction that includes the write address and the data to be written 501. The transaction may be stored in a buffer 415. Upon determining which near/far memory sub-system instance applies (e.g., from analysis of higher ordered bits 408), the hit miss logic 414 of memory side control (MSC) logic 424 provides the set bits 404 to near memory cache interface logic 416 to cause the cached entry for the applicable set to be read 502 from the near memory cache 402. Here, near memory cache interface logic 416 is responsible for implementing a protocol, including the generation/reception of electrical signals, specific to the near memory (e.g., DRAM) on memory channel 401.

As observed in FIG. 4, in an embodiment, each cache entry includes, along with its corresponding data 410, an embedded tag 411, a dirty bit 412 and ECC information 413.

The embedded tag 411 identifies which cache line in the entry's applicable set in far memory 401 is cached in cache 402. The dirty bit 412 indicates whether the cached entry is the only valid copy for the cache line. ECC information 413, as is known in the art, is used to detect and possibly correct for errors that occurred writing and/or reading the entry from/to the cache 402.

After the cached entry for the applicable set is read with the near memory cache interface logic 416, the MSC hit/miss logic 414 compares the embedded tag 411 of the just read entry against the tag 405 of the address of the write transaction 503 (note that the entry read from the cache may be stored in a read buffer 417). If they match, the cached entry corresponds to the target of the transaction (cache hit). Accordingly, the hit/miss logic 414 causes the near memory cache interface logic to write over 504 the just read cache entry in the cache 402 with the new data received for the transaction. The MSC control logic 424 in performing the write keeps the value of the embedded tag 411 unchanged. The MSC control logic 424 also sets the dirty bit 412 to indicate that the newly written entry corresponds to the only valid version the cache line, and calculates new ECC data for the cache line. The cache line read from the cache 402 in read buffer 417 is discarded. At this point, the process ends for a cache hit.

If the embedded tag 411 of the cache line read from cache 402 does not match the tag 405 of the transaction address (cache miss), as with a cache hit, the hit/miss logic 414 causes the near memory cache interface logic 416 to write the 505 new data associated with the transaction into the cache 402 (with the set bits 404 specified as the address) to effectively write over the cache line that was just read from the cache 402. The embedded tag 411 is written as the tag bits 405 associated with the transaction. The dirty bit 412 is written to indicate that the cached entry is the only valid copy for this cache line. The memory controller's ECC logic 420 calculates ECC information 413 for the cache line received with the transaction and the near memory cache interface logic 416 writes it into cache 402 along with the cache line.

With respect to the cache line that was just read from the cache and is stored in the read buffer 417, the near memory hit/miss logic 414 checks its associated dirty bit 506, and, if the dirty bit indicates that the cache line in the read buffer 417 is the only valid version of the cache line (the dirty bit is "set"), the hit/miss logic 414 causes the NVRAM controller 432, through its far memory interface logic 418, to write 507 the cache line into its appropriate far memory location (using the set bits 404 of the transaction and the embedded tag bits 411 of the cache line that was just read as the address). Here, far memory interface logic 418 is responsible for implementing a protocol, including the generation/reception of electrical signals, specific to the far memory (e.g., PCMS) on memory channel 401. If the dirty bit of the cache line in the read buffer 417 indicates that the cache line in the read buffer 417 is not the only valid version of the cache line, the cache line in the read buffer is discarded.

Here, during moments where the interfaces 416, 418 to the near memory cache and far memory are not busy, the MSC control logic 424 may read cache line entries from the cache 402, and, for those cache line entries having its dirty bit set, the memory controller will rewrite it into far memory and "clear" its associated dirty bit to indicate that the cache line in cache 402 is no longer the only valid copy of the cache line.

Moreover, it is pertinent to point out that, the respective near memory cache and far memory interfaces 416, 418 can be completely isolated from one another, or, have some overlap with respect to one another. Here, overlap corresponds to aspects of the respective near and far memory protocols and/or signaling that are the same (e.g., same clocking signals, same on-die termination signals, same addressing signals, etc.) and therefore may use the same circuitry for access to near memory cache and far memory. Non overlapping regions correspond to aspects of the two protocols and/or signaling that are not the same and therefore have circuitry applicable to only one of near memory cache and far memory.

The architecture described above can be used in implementations where the MSC control logic 424 is coupled to the near memory cache 402 over a different isolated memory channel than the memory channel through which the NVRAM controller 432 and far memory 401 are coupled through. Here, for any specific channel, one of interfaces 416, 418 is enabled while the other is disabled depending on whether near memory cache or far memory is coupled to the channel. Likewise, one of MSC control logic 424 and NVRAM controller 432 is enabled while the other is disabled. In an embodiment, a configuration register associated with the memory controller (not shown), which, for example, may be written to by BIOS, determines which configuration is to be enabled.

The same architecture above may also support another configuration in which near memory cache and far memory are coupled to the same channel 421. In this case, the integration of interfaces 416, 416 can be viewed as a single interface to the channel 421. According to this configuration, both interfaces 416, 418 and both controllers 424, 432 are "enabled" but only one set (interface 416 and controller 424 for near memory and interface 418 and controller 432 for far memory) is able to use the channel at any particular instant of time. Here, the usage of the channel over time alternates between near memory signaling and far memory signaling. This configuration may be established with, for instance, a third setting in the aforementioned configuration register. It is to this setting that the below discussion mostly pertains.

Here, by being able to use the same channel for both near memory accesses and far memory accesses, the near memory cache that is plugged into the channel can be used as the near memory cache for the far memory storage that is plugged into the same channel. Said another way, specific system memory addresses may be allocated to the one, single channel. The far memory devices that are plugged into the channel provides far memory storage for these specific system memory addresses, and, the near memory storage that is plugged into the same channel provides the cache space for these far memory devices. As such, the above described transactions that invoke both near memory and far memory (e.g., because of a cache miss and/or a dirty bit that is set) can transpire over the same channel.

According to one approach, the channel is designed to include mechanical receptacles/connectors that individual planar board cards having integrated circuits disposed on them (e.g., DIMMs) can plug into. Here, the cards have corresponding receptacles/connectors that mate with the channel's receptacles/connectors. One or more cards having only far memory storage can be plugged into a first set of connectors to effect the far memory storage for the channel. One or more cards having only near memory storage can be plugged into the same channel and act as near memory cache for the far memory cards.

Here, where far memory storage is inherently denser than near memory storage but near memory storage is inherently faster than far memory storage, channels can be designed with a "speed vs. density" tradeoff in mind. That is, the more near memory cards plugged into the channel, the faster the channel will perform but at the cost of less overall storage capacity supported by the channel. Contra wise, the fewer near memory cards plugged into to the channel, the slower the channel will perform but with the added benefit of enhanced storage capacity supported by the channel. Extremes may include embodiments where only the faster memory storage technology (e.g., DRAM) is populated in the channel (in which case it may act like a cache for far memory on another channel, or, not act like a cache but instead is allocated its own specific system memory address space), or, only the slower memory storage technology (e.g., PCMS) is populated in the channel.

In other embodiments, near memory and far memory are disposed on a same card in which case the speed/density tradeoff is determined by the card even if a plurality of such cards are plugged into the same channel.

FIG. 6 depicts a read transaction. According to the methodology of FIG. 6, the memory controller 431 receives a read transaction that includes the read address 611. The transaction may be stored in a buffer 415. Upon determining which near/far memory sub-system (e.g., which memory channel) instance applies, the MSC controller's hit miss logic 414 provides the set bits 404 to near memory cache interface logic 416 to cause the cached entry for the applicable set to be read 612 from the cache 402.

After the cached entry for the applicable set is read with the cache interface logic 416, the hit/miss logic 414 compares the embedded tag 411 of the just read entry against the tag 405 of the address of the read transaction 613. If they match, the cached entry corresponds to the target of the transaction (cache hit). Accordingly, the read process ends. If the embedded tag 411 of the cache line read from cache 402 does not match the tag 405 of the transaction address (cache miss), the hit/miss logic 414 causes the far memory interface logic 418 to read 614 the far memory storage at the address specified in the transaction (403, 404, 405). The cache line read from far memory is then written into the cache 615, and, if the dirty bit was set for the cache line that was read from near memory cache in step 612, the cache line that was read from near memory cache is written into far memory 616.

Although the MSC controller 424 may perform ECC checking on the read data that was read from far memory, as described in more detail below, according to various embodiments, ECC checking may be performed by logic circuitry 422 that resides local to the far memory device(s) (e.g., affixed to a same DIMM card that PCMS device(s) are affixed to). This same logic circuitry 422 may also calculate the ECC information for a write transaction in the case of a cache miss and the dirty bit is "set".

Moreover, in embodiments where the same memory channel 421 is used to communicate near memory signaling and far memory signaling, logic circuitry 422 can be utilized to "speed up" the core write and read processes described above. Some of these speed ups are discussed immediately below.

Figure 7A:
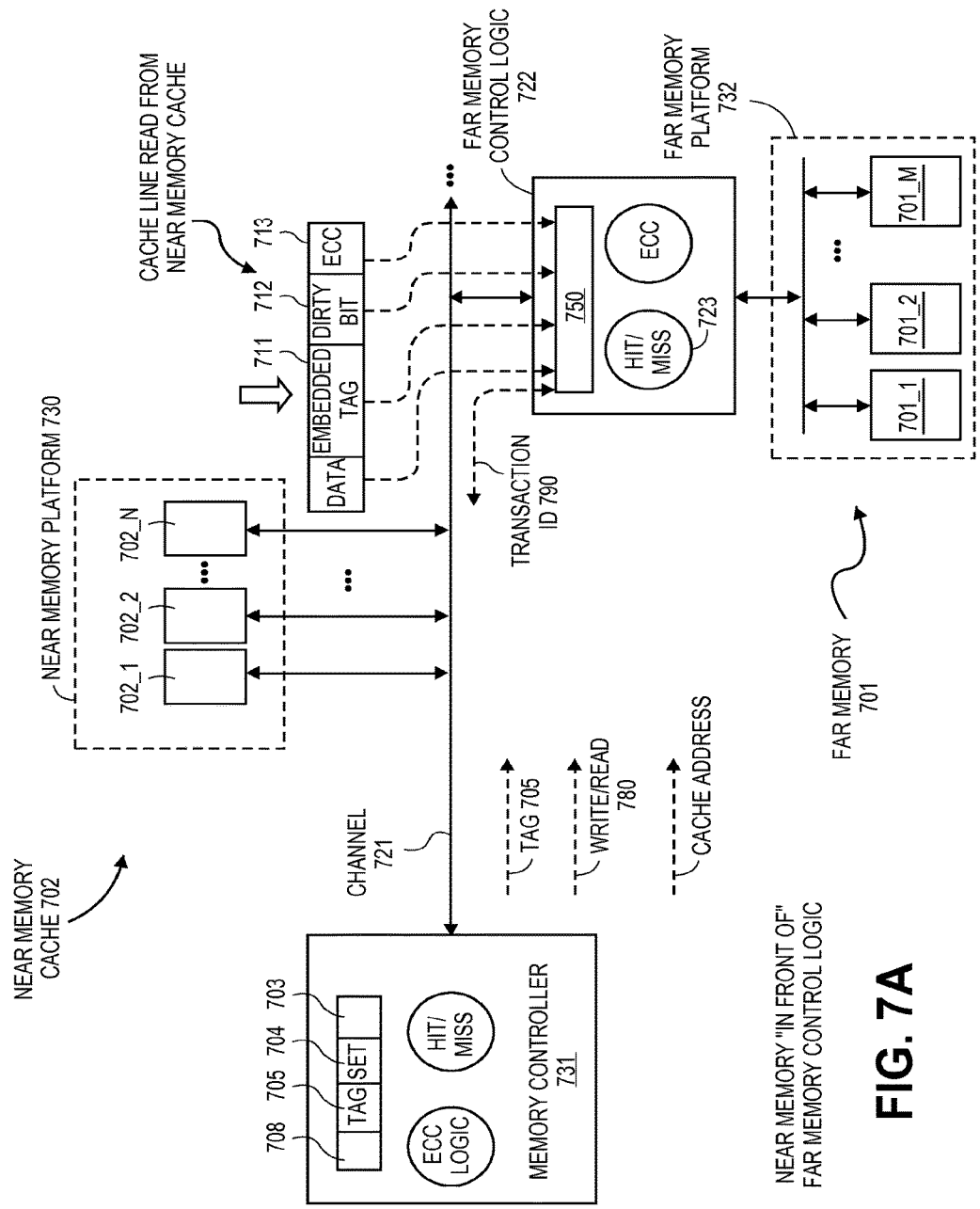
FIG. 7A illustrates a "near memory in front of" architecture for integrating near memory cache and far memory on a same memory channel.
Figure 8A:
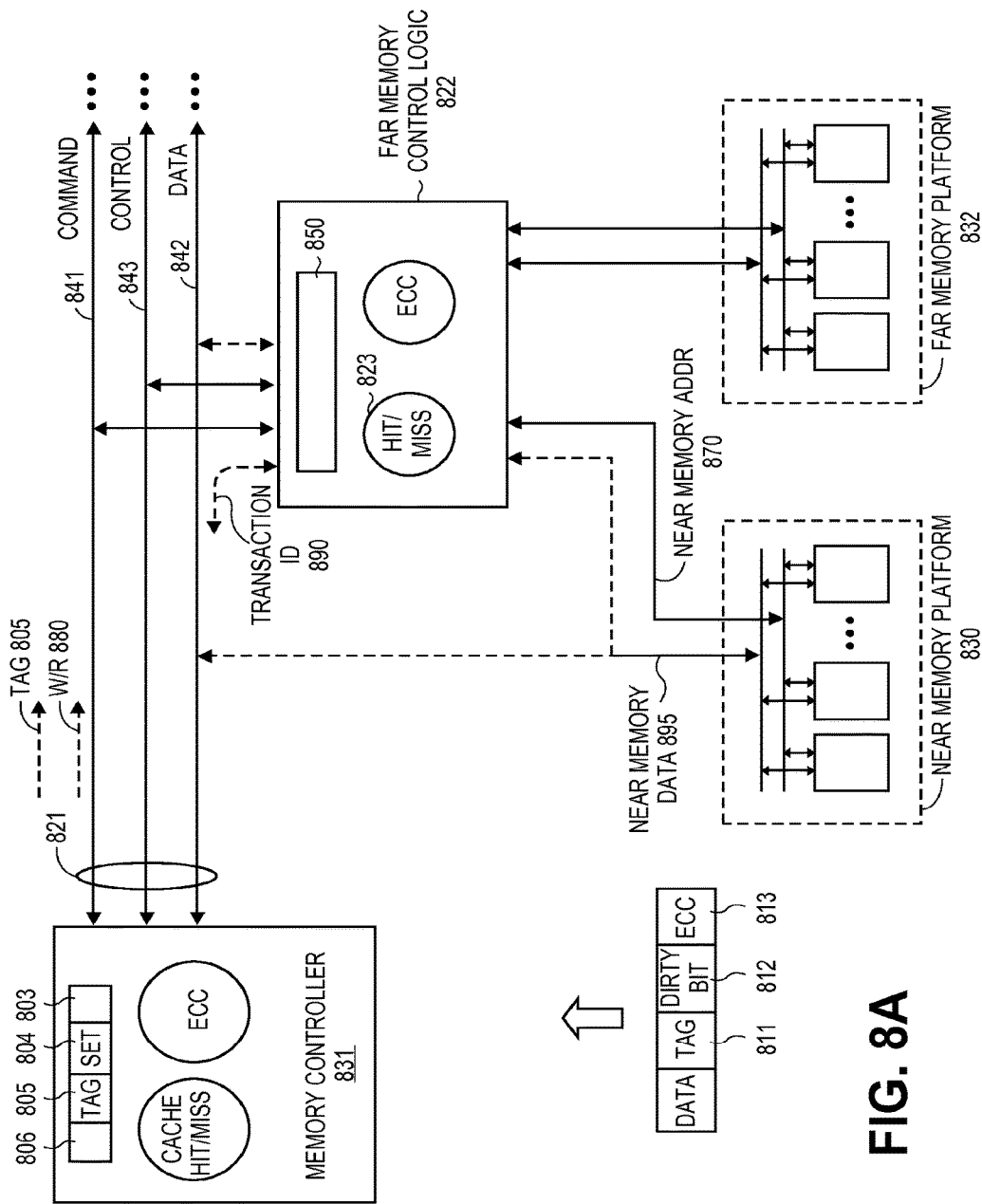
FIG. 8A illustrates a "near memory in front of" architecture for integrating near memory cache and far memory on a same memory channel.

Read and Write Transactions with Near Memory and Far Memory Coupled to a Same Memory Channel A. Near Memory "in Front of" Far Memory Control Logic FIG. 7a shows a "near memory in front of" approach while FIG. 8a shows a "near memory behind" approach. The "near memory behind" approach will be discussed in more detail further below. For each of the models below, as well as their ensuing discussions, the term "memory controller" or "host" or "host side" is used to refer (mainly) to circuitry and/or acts performed by an MSC controller or an NVRAM controller. Which circuitry applies in a particular situation is straightforward to understand in that, when near memory cache is being accessed on the channel, the MSC controller is involved, whereas, when far memory is being accessed on the channel, the NVRAM controller is involved. Moreover, the discussions below also refer to "far memory control logic" or a "far memory controller" that is remote from the host side and is located proximate to far memory "out on the channel". Here, the far memory control logic can be viewed as a component of the NVRAM controller, with, another component of the NVRAM controller resident on the host to perform appropriate far memory accesses (consistent with the embodiments below) from the host side.

Referring to FIG. 7a, note that the near memory storage devices 702_1, 702_2 . . . 702_N (such as a plurality of DRAM chips) are coupled to a channel 721 independently of the coupling of far memory logic circuitry 722 (and its associated far memory storage devices 701_1, 701_2, . . . 702_M (such as a plurality of PCMS chips) to the same channel 721.

Said another way, a near memory platform 730 and a far memory platform 732 are separately connected to the same channel 721 independently of one another. This approach can be realized, for example, with different DIMMS having different respective memory storage technologies plugged into a same memory channel (e.g., near memory platform 730 corresponds to a DRAM DIMM and far memory platform 732 corresponds to a PCMS DIMM). This approach can also be realized, for example, with a same DIMM that incorporates different respective memory storage technologies (e.g., near memory platform 730 corresponds to one side of a DIMM and far memory platform 732 corresponds to the other side of the DIMM).

Figure 7B:
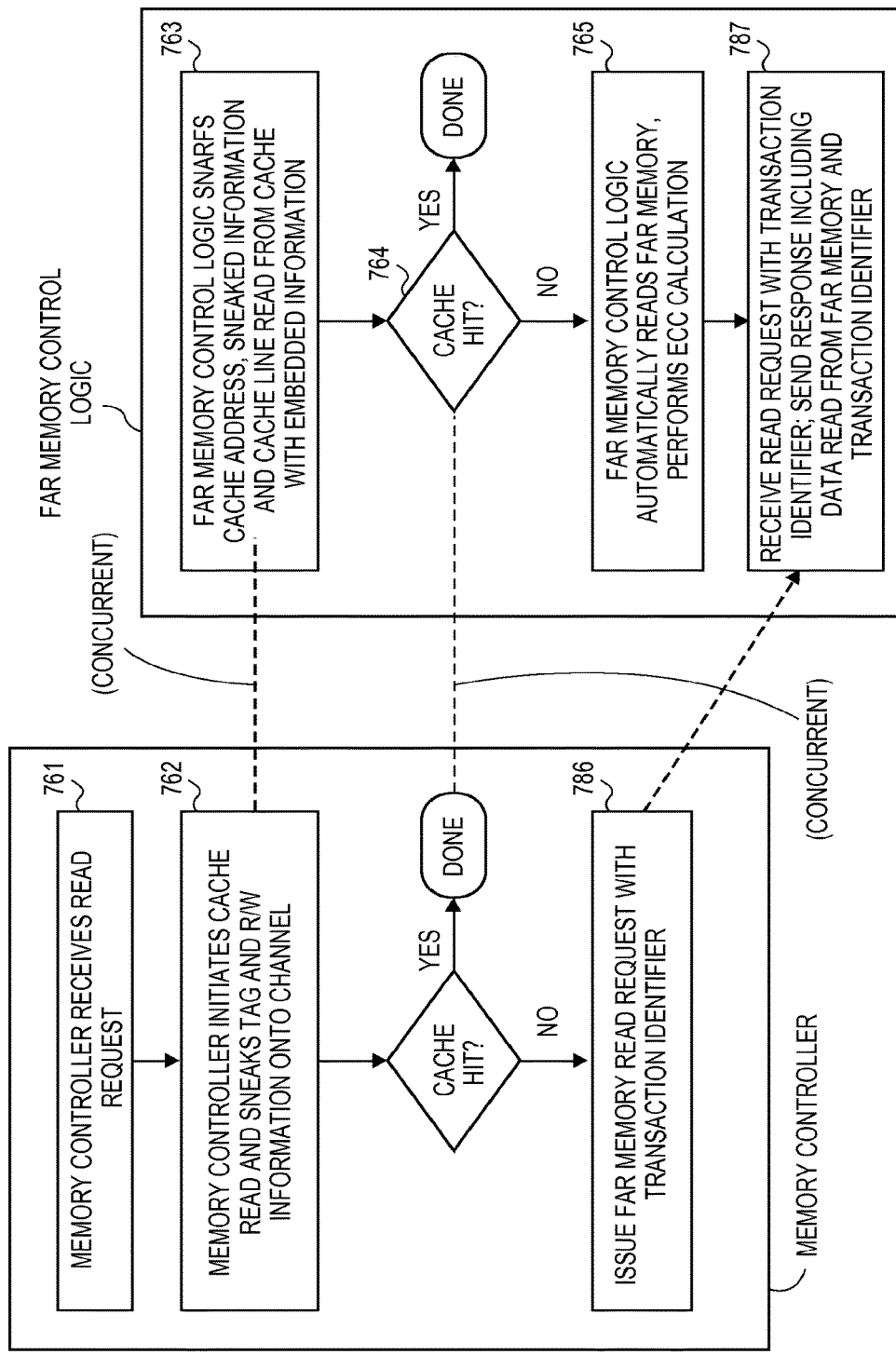
FIGS. 7B-D illustrate processes that can be performed by the system of FIG. 7A.

FIG. 7b shows a read transaction that includes a cache miss where the far memory control logic 722 automatically detects the cache miss and automatically reads far memory in response. Referring to FIGS. 7a and 7b, the host side MSC control logic 424a receives a read request 761 and reads the cache line entry 762 for the applicable set from the cache 702. As part of the transaction on the channel 721 that accesses the cache 702, the host side MSC control logic 424a "sneaks" the tag bits 705 of the original read request onto the channel 721. In a further embodiment, the host side MSC control logic 424a can also sneak information 780 indicating that the original transaction request received by the memory controller is a read request (rather than a write request).

According to one approach, explained in more detail below, the tag bits 705 and read/write information 780 are "snuck" on unused row or column addresses of the near memory address bus. In a further embodiment, more column address bits are used for this purpose than row address bits. According to an even further approach, the sneaked information 705, 780 is provided over a command bus component of channel 721 which is used for communicating addressing information to the near memory storage device (and potentially the far memory devices as well).

Because remote control logic circuitry 722 is connected to the channel 721, it can "snarf": 1) the tag bits 705 from the original request (and indication 780 of a read transaction) when they are snuck on the channel 721; 2) the read address applied to the near memory cache 702; and, 3) the cache line and its associated embedded tag bits 711, dirty bit 712 and ECC information 713 when read from the near memory cache 702. Here, the snarfing 763 is understood to include storing any/all of these items of information locally (e.g., in register space 750 embedded) on logic circuitry 722.

As such, far memory control logic circuitry 722, which also includes its own hit/miss logic 723, can determine 764 whether there is a cache hit or cache miss concurrently with the memory controller's hit/miss logic 714. In the case of a cache hit, the far memory control logic circuitry 722 takes no further action and the memory controller 731 performs the ECC calculation on the data read from cache and compares it with the embedded ECC information 714 to determine whether or not the cache read data is valid.

However in the case of a cache miss, and with knowledge that the overall transaction is a read transaction (e.g., from snuck information 780), the logic circuitry 722 will recognize that a read of its constituent far memory storage 701 will be needed to ultimately service the original read request. As such, according to one embodiment, logic circuitry 722 can automatically read 765 its associated far memory resources 732 to retrieve the desired read information, perform an ECC calculation on the cache line read from far memory (which also has embedded ECC information) and, if there is no corruption in the data, provide the desired far memory read information.

In order to perform this kind of "automatic read", as alluded to just above, logic circuitry 722 should be informed by the memory controller 731 in some manner that the overall transaction is a read operation as opposed to a write operation (if the above described transaction were a write transaction, logic circuitry would not need to perform a read of far memory). According to one embodiment, as already mentioned above, read/write information 780 that is indicative as to whether a write transaction or a read transaction is at play is "snuck" to logic circuitry 722 (e.g., along with the tag information 705 of the original transaction request).

Concurrently with the far memory control logic 722 automatically reading far memory 732, the memory controller 731 can schedule and issue a read request 786 on the channel 721 to the far memory control logic 722. As described in more detail below, in an embodiment, the memory controller 731 is configured to communicate two different protocols over channel 721: i) a first protocol that is specific to the near memory devices 730 (e.g., an industry standard DDR DRAM protocol); and, ii) a second protocol that is specific to the far memory devices 732 (e.g., a protocol that is specific to PCMS devices). Here, the near memory cache read request 762 is implemented with the first protocol and, by contrast, the read request to far memory 786 is implemented with the second protocol.

In a further embodiment, as described in more detail further below, because the time needed by the far memory devices 732 to respond to the read request 786 cannot be predicted with certainty, an identifier 790 of the overall read transaction ("transaction id") is sent to the far memory control logic 722 along with the far memory read request 786 sent by the memory controller. When the data is finally read from far memory 732 it is eventually sent 787 to the memory controller 731. In an embodiment, the transaction identifier 790 is returned to the memory controller 731 as part of the transaction on the channel 721 that sends the read data to the memory controller 731.

Here, the inclusion of the transaction identifier 790 serves to notify the memory controller 731 of the transaction to which the read data pertains to. This may be especially important where, as described in more detail below, the far memory control logic 722 maintains a buffer to store multiple read requests from the memory controller 731 and the uncertainty of the read response time of the far memory leads to "out-of-order" (OOO) read responses from far memory (a subsequent read request may be responded to before a preceding read request). In a further embodiment, a distinctive feature of the two protocols used on the channel 721 is that the near memory protocol treats devices 730 as slave devices that do not formally request use of the channel 721 (because their timing is well understood and under the control of the memory controller). By contrast, the far memory protocol permits far memory control logic 722 to issue a request to the memory controller 731 for the sending of read data to the memory controller 731. As a further point of distinction, the tag 705 and r/w information 780 that is "snuck" onto the channel during the near memory cache read is "snuck" in the sense that this information is being transported to the far memory control logic circuitry and is pertinent to a potential far memory access even though, technically, the near memory protocol is in play.

Alternatively to the "automatic" read discussed above with respect to FIG. 7b, the far memory control logic circuitry 722 can be designed to refrain from automatically reading the needed data and instead wait for a read request and corresponding address from the memory controller in the case of a cache miss. In this case, logic circuitry 722 need not snarf the address when the near memory cache is read, nor does any information concerning whether the overall transaction is a read transaction or a write transaction need to be snuck to logic circuitry 722. The sending of a transaction ID 790 with the read request to the far memory control logic 722 may still be needed if far memory control logic 722 can service read requests out of order.

Figure 7C:
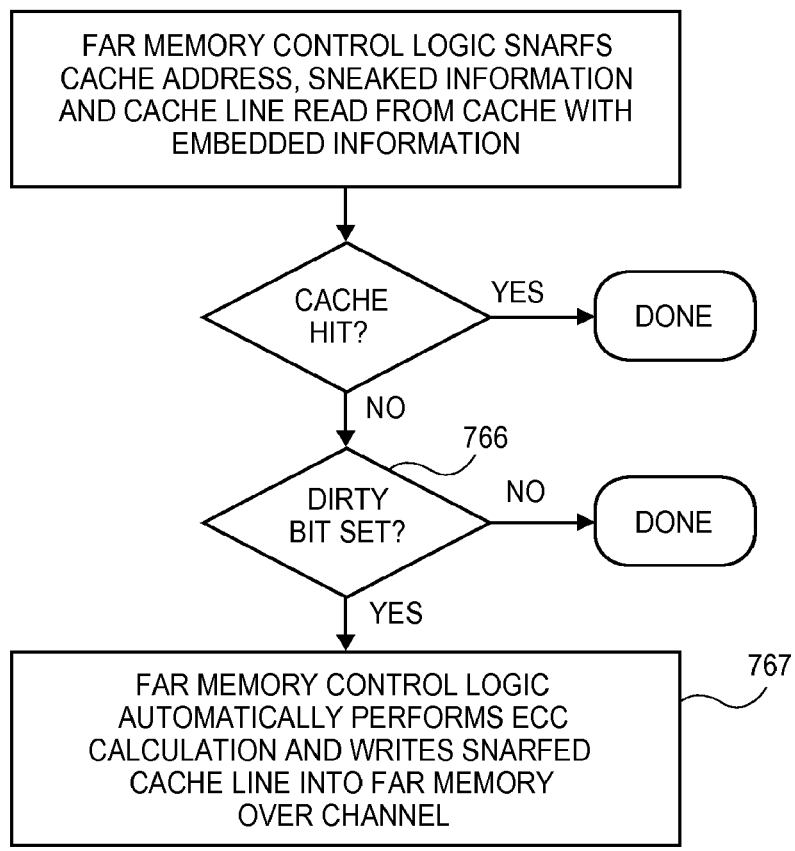

Regardless as to whether or not the logic circuitry 722 automatically performs a needed far memory read on a cache miss, as observed in FIG. 7c, in the case of a cache miss detected by the far memory control logic circuitry 722, the hit/miss logic circuitry 723 of far memory control logic circuitry 722 can be designed to check if the dirty bit 712 is set in the snarfed cache line 766. If so, the snarfed cache line will need to be written to far memory 732. As such, logic circuitry 722 can then automatically store 767 the snarfed cache line into its constituent far memory storage resources 732 without a formal request from the memory controller (including the recalculation of the ECC information before it is stored to ensure the data is not corrupted).

Here, depending on implementation, for the write operation to the far memory platform, logic circuitry 722 can construct the appropriate write address either by snarfing the earlier read address of the near memory cache read as described above and combining it with the embedded tag information of the cache line that was read from the near memory cache. Alternatively, if logic circuitry 722 does not snarf the cache read address, it can construct the appropriate write address by combining the tag information embedded in the snarfed cache line with a read address provided by the memory controller when it requests the read of the correct information from far memory. Specifically, logic circuitry 722 can combine the set and lowered ordered bits portions 404, 405 of the read request with the embedded tag 711 on the snarfed cache line to fully construct the correct address.

Automatically performing the write to the far memory platform 732 as described above eliminates the need for the memory controller 731 to request the write to the far memory platform, but also, and in furtherance, completely frees the channel 721 of any activity related to the write to the far memory platform. This may correspond to a noticeable improvement in the speed of the channel.

It is pertinent to point that the pair of speed-ups described just above: automatic read of far memory (FIG. 7b) and automatic write to far memory (FIG. 7c) can be implemented in any combination (both, just one) depending on designer choice.

As a matter of contrast, a basic read transaction without any speedup offered by the presence of the far memory controller 722 nominally includes six atomic operations for a read transaction that suffers a cache miss when the dirty bit is set. These are: cache read request, cache read response, far memory read request, far memory read response, near memory write request (cache update) and far memory write request (load cache line read from cache into far memory because dirty bit is set).

By contrast, with both of the speedups of FIG. 7b (automatic read of far memory) and FIG. 7c (automatic write to far memory) being implemented, the overall transaction can be completed with only four atomic operations on the channel. That is, the far memory read request and far memory write request can be eliminated.

Figure 7D:
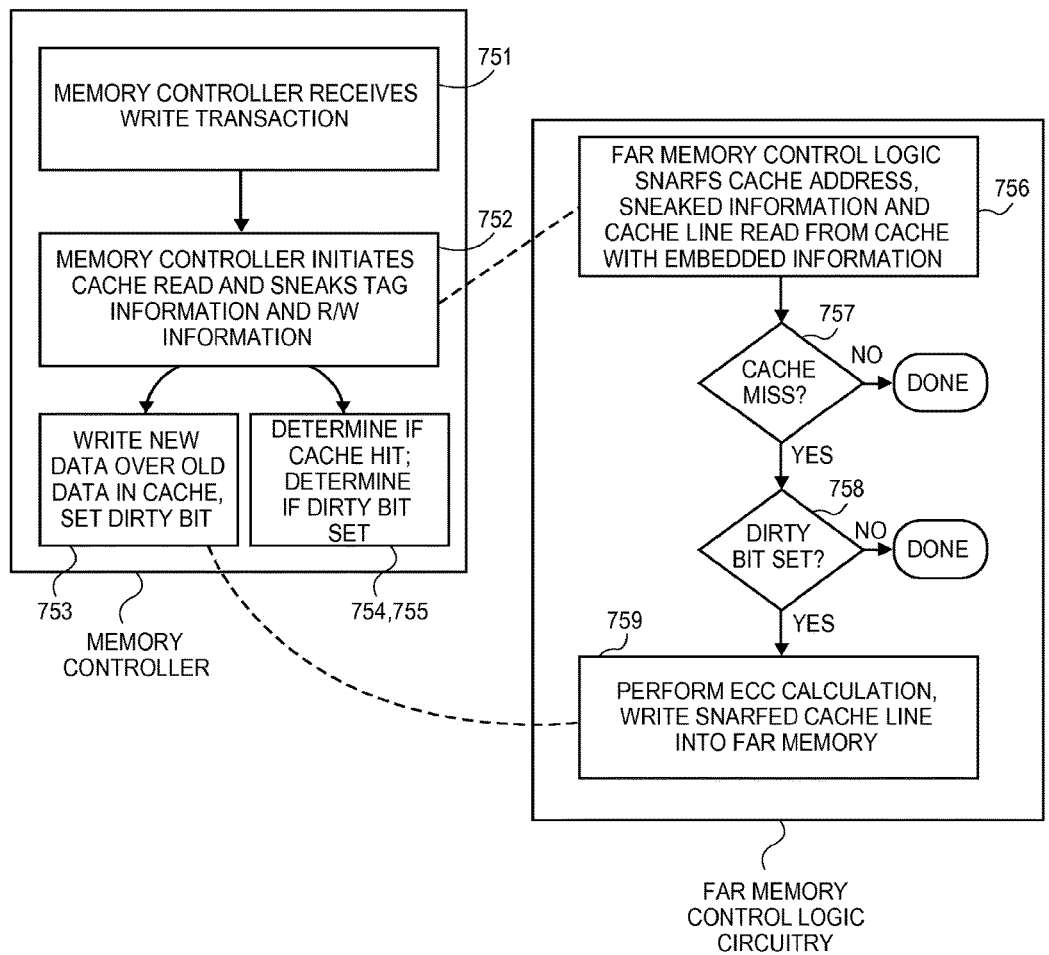

The above discussion concerned read transaction processes when the near memory is "in front of" the far memory control logic. In the case of a write transaction process, referring to FIG. 7d, in response to the receipt of a write transaction 751, the memory controller initiates a near memory cache read, and, sneaks tag information 705 and information 780 indicating that the overall transaction is a write and not a read as described above 752. After the read of near memory is complete, the memory controller 731 writes the new data over the old data in cache 753. In an embodiment, the memory controller checks to see if there is a cache hit 754 and/or if the dirty bit is set 755 to understand what action the far memory control logic circuitry will take (e.g., for channel scheduling), but otherwise takes no further action on the channel.

Far memory control logic circuitry 722 snarfs the address used to access the cache, the sneaked information 705, 780 and the cache line read from cache with its associated information 756 and detects the cache miss on its own accord 757 as described above. If there is a cache hit, far memory control logic takes no further action. If there is a cache miss, depending on design implementation, similar to the processes described above, logic circuitry 722 can also detect 758 whether the dirty bit is set and write 759 the snarfed cache line into far memory automatically (without a request from the memory controller).

In an alternate approach, the memory controller 731, after detecting a cache miss and that the dirty bit is set 754, 755, sends a request to the far memory control logic 722 (including the write address) to write the cache line read from the cache into far memory. The memory controller can also send the cache line read from cache to the far memory control logic over the channel 721.

B. Near Memory "Behind" Far Memory Control Logic

Referring to FIG. 8a, which depicts a "near memory behind" architecture, note that the near memory storage devices 802_1, 802_2 . . . 802_N (such as a plurality of DRAM chips) are coupled to at least a portion of the channel 821 through the far memory control logic circuitry 822 at least to some extent. Here, whereas the far memory control logic for a "near memory in front of approach" includes distinct interfaces for the channel and far memory, by contrast, the far memory control logic for the "near memory behind" approach includes distinct interfaces for the channel, far memory and near memory. According to one embodiment, the channel 821 can be viewed as having three principle sub-components: 1) a command bus 841 (over which read and write requests and their corresponding addresses are sent); 2) a data bus 842 (over which read and write data is sent); and, 3) control signals 843 (e.g., select signal(s), clock enable signal(s), on-die termination signal(s)).

As depicted in the particular approach of FIG. 8a, the data bus 890 of the near memory storage platform 830 may be independently coupled 891 to the data bus 842, but, is coupled to the command bus 841 and control signals 843 components through logic circuitry 822. The far memory storage platform 831 is coupled to all three subcomponents 841, 842, 843 through logic circuitry 822. In an alternate embodiment, the data bus 890 of the near memory storage platform 830, like the far memory storage platform, is coupled to the channel's data bus component 842 through logic circuitry 822. The "near memory behind" architecture may at least be realized, for example, with the logic circuitry 822, near memory storage devices 830 and far memory storage devices 831 all being implemented on a same physical platform (e.g., a same DIMM card that plugs into the channel where multiple such DIMM cards can be plugged into the channel).

Figure 8B:
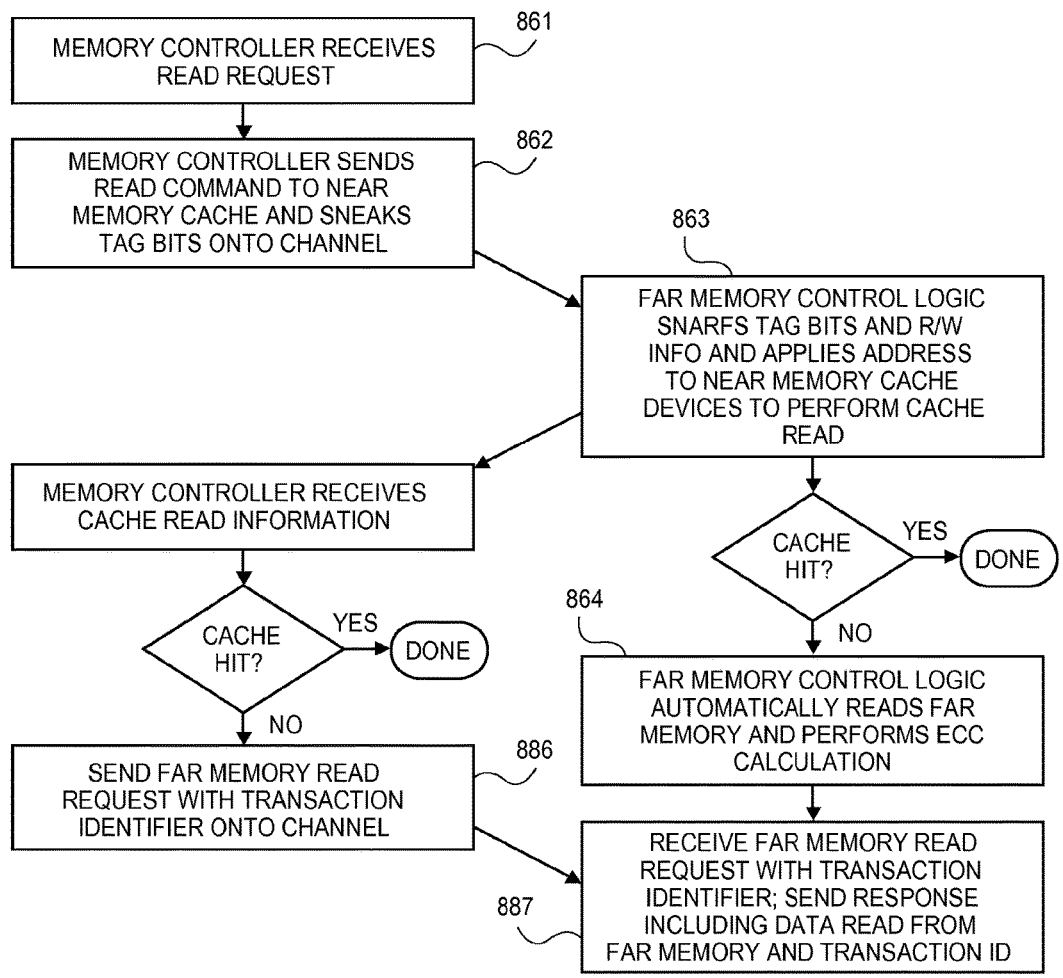
FIGS. 8B-D illustrate processes that can be performed by the system of FIG. 8A.

FIG. 8b shows a read process for a "near memory behind" architecture in the case of a cache miss. Referring to FIGS. 8a and 8b, if the memory controller 831 receives a read request 861 it sends, over command bus 841, a read request 862 (e.g., in packetized form) to far memory control logic circuitry 822 containing the set bits 804 and lower ordered bits 803 of the original request's address. Moreover, as part of the read request sequence, the tag bits 805 of the original read request (e.g., from the CPU) is "snuck" 862 onto the channel 821. According to one approach, explained in more detail below, the tag bits 805 are "snuck" on the command bus component 841 of the channel 821 (which is used for communicating addressing information to the far memory control logic 822 for both near and far memory accesses). Here, unlike the far memory "in front of" approach, for reasons explained further below, additional information that indicates whether the original transaction is a read or write need not be snuck on the channel. Here, the far memory control logic 822 can "key" off of the read request to far memory by the memory controller to determine that the overall transaction is a read transaction and not a write transaction.

Logic circuitry 822, in response to the received read request, presents the associated address on the local near memory address bus 870 to effect a cache read operation to the near memory platform. The appropriate cache line from the near memory platform 830 is subsequently presented 804 on the data bus 842 either directly by the near memory platform 830, in which case the memory controller performs the ECC calculation, or through the far memory control logic 822, in which case both logic 822 and memory controller 831 may perform ECC calculations.

Because far memory control logic circuitry 822 is connected to the channel 821, it can "snarf" or otherwise locally store 863 (e.g., in its own register space 850) any of: 1) the tag bits 805 that were snuck on the channel 821; 2) the address information used to address the near memory cache 830; and, 3) the cache line from near memory 830 and its associated embedded tag bits 811, dirty bit 812 and ECC information 813 when provided by the near memory platform 830.

In response, the hit/miss logic 823 of logic circuitry 822 can determine whether there is a cache hit or cache miss concurrently with the memory controller's hit/miss logic 814. In the case of a cache hit, the information read from near memory is provided to the memory controller 831 and logic circuitry 822 takes no further action. In an embodiment where the near memory cache platform is connected to the data bus without going through logic circuitry 822, the memory controller 831 performs the ECC calculation on the cache line read from near memory cache. In another embodiment where the near memory cache platform connects to the data bus through logic circuitry 822, the ECC calculation on the cache line read from near memory cache is calculated on both logic circuitry 822 and the memory controller 831.

In the case of a cache miss detected by the logic circuitry 822, the cache/hit miss logic circuitry 823 will recognize that a read of the far memory storage platform 831 will be needed to ultimately service the original read request. As such, according to one embodiment, the logic circuitry 822 can automatically read from the far memory platform 831 to retrieve the desired read information 864 and perform an ECC calculation.

Concurrently with the far memory control logic 822 automatically reading far memory 831, recalling that the memory controller 831 has already been provided with the cache line read from near memory, the memory controller 831 can likewise detect the cache miss and, in response, schedule and issue a read request 886 on the channel 821 to the far memory control logic 822. As alluded to above and as described in more detail below, in an embodiment, the memory controller 831 is able to communicate two different protocols over channel 821: i) a first protocol that is specific to the near memory devices 830 (e.g., an industry standard DDR DRAM protocol); and, ii) a second protocol that is specific to the far memory devices 831 (e.g., a protocol that is specific to PCMS devices). Here, the near memory cache read 862 is implemented with a first protocol over channel 821, and, by contrast, the read request to far memory 886 is implemented with the second protocol.

In a further embodiment, as alluded to above and as described in more detail further below, because the time needed by the far memory devices 831 to respond to the read request 886 cannot be predicted with certainty, an identifier 890 of the overall read transaction ("transaction id") is sent to the far memory control logic 822 along with the far memory read request 886 sent by the memory controller. When the data is finally read from far memory 831 it is eventually sent 887 to the memory controller 831. In an embodiment, the transaction identifier 890 is returned to the memory controller 831 as part of the transaction on the channel 821 that sends the read data to the memory controller 831.

Here, the inclusion of the transaction identifier 890 serves to notify the memory controller 831 of the transaction to which the read data pertains to. This may be especially important where, as described in more detail below, the far memory control logic 822 maintains a buffer to store multiple read requests from the memory controller 831 and the uncertainty of the read response time of the far memory leads to "out-of-order" (OOO) read responses from far memory (a subsequent read request may be responded to before a preceding read request).

In a further embodiment, where two different protocols are used on the channel, a distinctive feature of the two protocols is that the near memory protocol treats devices 830 as slave devices that do not formally request use of the channel 821 (because the timing of the near memory devices is well understood and under the control of the memory controller). By contrast, the far memory protocol permits far memory control logic 822 to issue a request to the memory controller 831 for the sending of read data to the memory controller 831. As an additional point of distinction, the tag 805 information that is "snuck" onto the channel during the near memory cache read is "snuck" in the sense that this information is being transported to the far memory control logic circuitry 822 for a potential far memory read even though, technically, the near memory protocol is in play.

Alternatively to automatically performing the far memory read, the far memory control logic circuitry 822 can be designed to refrain from automatically reading the needed data in far memory and wait for a read request and corresponding address from the memory controller 831. In this case, logic circuitry 822 does not need not to keep the address when the near memory cache is read, nor does it need any sneaked information 880 concerning whether the overall transaction is a read transaction or a write transaction from the memory controller 831.

Figure 8C:
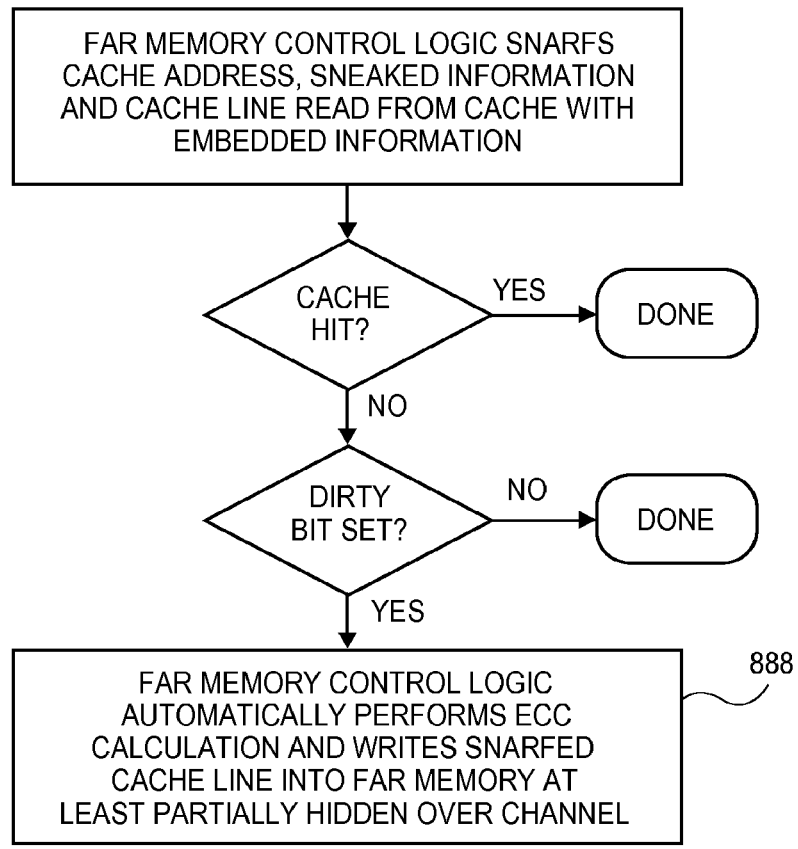

Regardless as to whether or not the logic circuitry 822 automatically performs a far memory read in the case of a cache miss, as observed in the process of FIG. 8*c*, the hit/miss logic circuitry 823 of logic circuitry 822 can be designed to write the cache line that was read from near memory cache into far memory when a cache miss occurs and the dirty bit is set. In this case, at a high level, the process is substantially the same as that observed in FIG. 7*c*—except that the write to near memory 830 is at least partially hidden 867 from the channel 821 in the sense that the near memory platform 830 is not addressed over the channel. If the data bus 895 of the near memory platform 830 is not directly coupled to the data bus of the channel 842, but is instead coupled to the data bus 842 of the channel through the far memory control logic 822, the entire far memory write can be hidden from the channel 821.

Automatically performing the write to the far memory platform 831 in this manner not only eliminates the need for the memory controller 831 to request the write, but also, completely frees the channel 821 of any activity related to the write to the far memory platform 831. This should correspond to a noticeable improvement in the speed of the channel.

Additional efficiency may be realized if the far memory control logic circuitry 822 is further designed to update the near memory cache platform 830 with the results of a far memory read operation, in the case of a cache miss, in order to effect the cache update step. Here, as the results of the far memory read operation 869 correspond to the most recent access to the applicable set, these results also need to be written into the cache entry for the set in order to complete the transaction. By updating the cache with the far memory read response, a separate write step over the channel 821 to near memory to update the cache is avoided. Here, some mechanism (e.g., additional protocol steps) may need to be implemented into the channel so that the far memory control logic can access the near memory (e.g., if the usage of the near memory is supposed to be scheduled under the control of the memory controller 831).

It is pertinent to point that the speed-ups described just above: automatic read of far memory (FIG. 8*b*), automatic write to far memory (FIG. 8*c*), and cache update concurrent with read response may be implemented in any combination (all, any two, just one) depending on designer choice.

In the case of a write transaction process, according to one approach where the near memory data bus 880 is directly coupled to the channel data bus 842, the process described above with respect to FIG. 7*d* can be performed. Another approach, presented in FIG. 8*d*, may be used where the near memory data bus 880 is coupled to the channel data bus 842 through the far memory control logic 822.

Figure 8D:
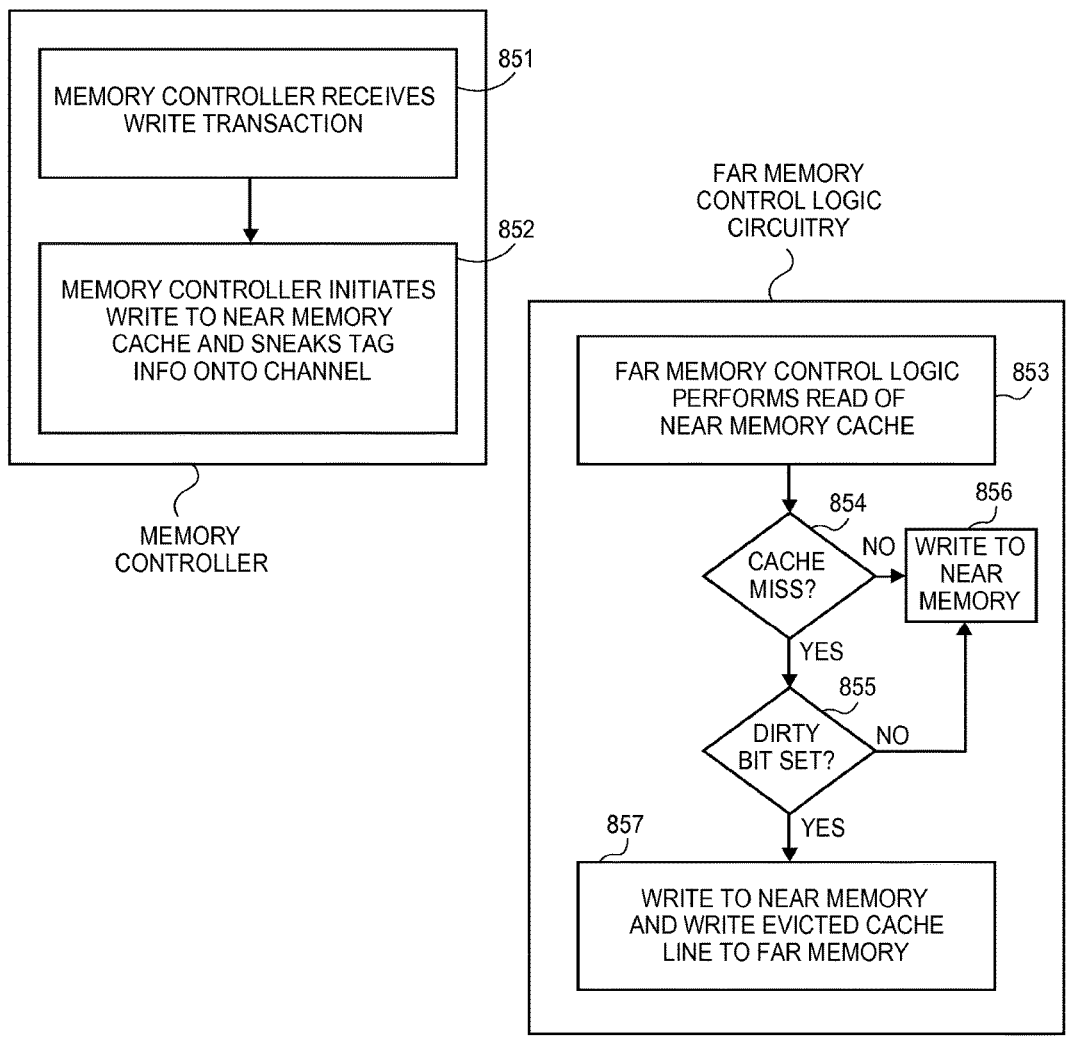

According to the process of FIG. 8*d*, in response to the receipt of a write transaction 851, the memory controller sends a write command 852 to the far memory control logic 822 (including the corresponding address and data) and sneaks the write transaction's tag information over the channel. In response, the far memory control logic 822 performs a read 853 of the near memory cache platform 830 and determines from the embedded tag information 811 and the sneaked tag information 805 whether a cache miss or cache hit has occurred 854. In the case of a cache hit or a cache miss when the dirty bit is not set 855, the new write data received with the write command is written 856 to near memory cache 830. In the case of a cache miss and the dirty bit is set, the far memory control logic circuitry writes the new write data received with the write command into near memory cache and writes the evicted cache line just read from near memory 830 into far memory 831.

Recall from the discussion of the read transaction of FIG. 8*b* that information indicative of whether the overall transaction is a read or write does not need to be snuck to the far memory control logic in a "near memory behind" approach. This can be seen from FIGS. 8*b* and 8*d* which show the memory controller initially communicating a near memory read request in the case of an overall read transaction (FIG. 8*a*), or, initially communicates a near memory write transaction in the case of an overall write transaction (FIG. 8*d*).

Atomic Channel Transactions and Physical Channel Integration

As observed in FIGS. 7*a* and 8*a*, communications between the memory controller and near memory devices may be carried over a same channel that communications between the memory controller and far memory devices are communicated. Further, as mentioned above, near memory and far memory may be accessed by the memory controller with different protocols (e first protocol for accessing near memory and a second protocol for accessing far memory. As such two different protocols may be implemented, for example, on a same memory channel. Various aspects of these protocols are discussed immediately below.

a. Near Memory Cache Access (First Protocol)

Two basic approaches for accessing near memory were presented in the sections above: a first where the near memory storage devices reside "in front of" the far memory control logic, and, a second where the near memory storage devices reside "behind" the far memory control logic.

i. Near Memory in Front

At least in the case where the near memory devices are located "in front of" the far memory control logic, it may be beneficial to preserve or otherwise use an existing/known protocol for communicating with system memory. For example, in the case where near memory cache is implemented with DRAM devices affixed to a DIMM card, it may be beneficial to use a memory access protocol that is well established/accepted for communicating with DRAM devices affixed to a DIMM card (e.g., either a presently well established/accepted protocol, or, a future well established/accepted protocol). By using a well established/accepted protocol for communicating with DRAM, economies of scale may be achieved in the sense that DIMM cards with DRAM devices that were not necessarily designed for integration into a computing system having near and far memory levels may nevertheless be "plugged into" the memory channel of such a system and utilized as near memory.

Moreover, even in cases where the near memory is located "behind" the far memory control logic, when attempting to access near memory, the memory controller may nevertheless be designed to communicate to the far memory control logic using well established/known DRAM memory access protocol so that the system as a whole may offer a number of different system configuration options to a user of the system. For example, a user can choose between using: 1) "DRAM only" DIMM cards for near memory; or, 2) DIMM cards having both DRAM and PCMS devices integrated thereon (with the DRAM acting as the near memory for the PCMS devices located on the same DIMM).

Implementation of a well established/known DRAM protocol also permits a third user option in which a two level memory scheme (near memory and far memory) is not adopted (e.g., no PCMS devices are used to implement system memory) and, instead, only DRAM DIMMs are installed to effect traditional "DRAM only" system memory. In this case, the memory controller's configuration would be set so that it behaved as a traditional memory controller (that does not utilize any of the features described herein to effect near and far memory levels).

As such, logic circuitry that causes the memory controller to behave like a standard memory controller would be enabled, whereas, logic circuitry that causes the memory controller to behave in a manner that contemplates near and far memory levels would be disabled. A fourth user option may be the reverse where system memory is implemented only in an alternative system memory technology (e.g., only PCMS DIMM cards are plugged in). In this case, logic may be enabled that causes the memory controller to execute basic read and write transactions only with a different protocol that is consistent with the alternative system memory technology (e.g., PCMS specific signaling).

FIG. 9a shows an exemplary depiction of a memory channel 921 that is adapted to support a well established/known DRAM access protocol (such as Double Data Rate ("DDR") which effects read and write accesses on rising and falling edges of a same signal). The channel 921 can be viewed as having three principle sub-components: 1) a command bus 941 (over which read and write requests and their corresponding addresses are sent); 2) a data bus 942 (over which read and write data is sent); and, 3) control signals 943 (select signal(s) 943_1, clock enable signal(s) 943_2, on-die termination signal(s) 943_3). In an embodiment, as described above, the memory controller 909 presents traditional DDR signals on the channel when it is accessing near memory cache regardless if it is "talking to" actual DRAM devices on one or more DIMM cards, and/or, one or more far memory control logic chips on one or more same or additional DIMM cards.

According to one embodiment of the operation of channel 921, for near memory accesses: 1) the command bus 941 carries packets in the direction from the memory controller 909 toward the near memory storage devices, where each packet includes a read or write request and an associated address; and, 2) the data bus 942 carries write data to targeted near memory devices, and, carries read data from targeted near memory devices.

As observed in FIG. 9a, the data bus 942 is composed of additional lines beyond actual read/write data lines 942_1. Specifically, the data bus 942 also includes a plurality of ECC lines 942_2, and strobe lines 942_3. As well known, ECC bits are stored along with a cache line's data so that data corruption errors associated with the reading/writing of the cache line can be detected. For example, a 64 byte (64B) cache line may additionally include 8 bytes (8B) of ECC information such that the actual data width of the information being stored is 72 bytes (72B). Strobes lines 942_3 are typically assigned on a per data line basis (e.g., a strobe line pair is assigned for every 8 or 4 bits of data/ECC). In a double data rate approach, information can be written or read on both rising and falling edges of the strobes 942_3.

With respect to the control lines 943, in an embodiment, these include select signals 943_1, clock enable lines 943_2, and on-die termination lines 943_3. As is well known, multiple DIMM cards can be plugged into a same memory channel. Traditionally, when a memory controller reads or writes data at a specific address, it reads or writes the data from/to a specific DIMM card (e.g., an entire DIMM card or possibly a side of a DIMM card or other portion of a DIMM card). The select signals 943_1 are used to activate the particular DIMM card (or portion of a DIMM card) that is the target of the operation, and, deactivate the DIMM cards that are not the target of the operation.

Here, the select signals 943_1 may be determined from the bits of the original read or write transaction (e.g., from the CPU) which effectively specify which memory channel of multiple memory channels stemming from the memory controller that is the target of the transaction, and, further, which DIMM card of multiple DIMM cards plugged into the identified channel is the target of the transaction. Select signals 943_1 could conceivably be configured such that each DIMM card (or portion of a DIMM) plugged in a same memory channel receives its own one unique select signal. Here, the particular select signal sent to the active DIMM card (or portion of a DIMM card) for the transaction is activated, while the select signals sent to the other DIMM cards are deactivated. Alternatively, the signal signals are routed as a bus to each DIMM card (or portion of a DIMM card). The DIMM card (or portion of a DIMM card) that is selected is determined by the state of the bus.

The clock enable lines 943_2 and on-die termination lines 943_3 are power saving features that are activated before read/write data is presented on the channel's data bus 942, and, deactivated after read/write data is presented on the channel's data bus 942_1.

In various embodiments, such as near memory cache constructed from DRAM, the timing of near memory transactions are precisely understood in terms of the number of clock cycles needed to perform each step of a transaction. That is, for near memory transactions, the number of clock cycles needed to complete a read or write request is known, and, the number of clock cycles needed to satisfy a read or write request is known.

Figure 10:
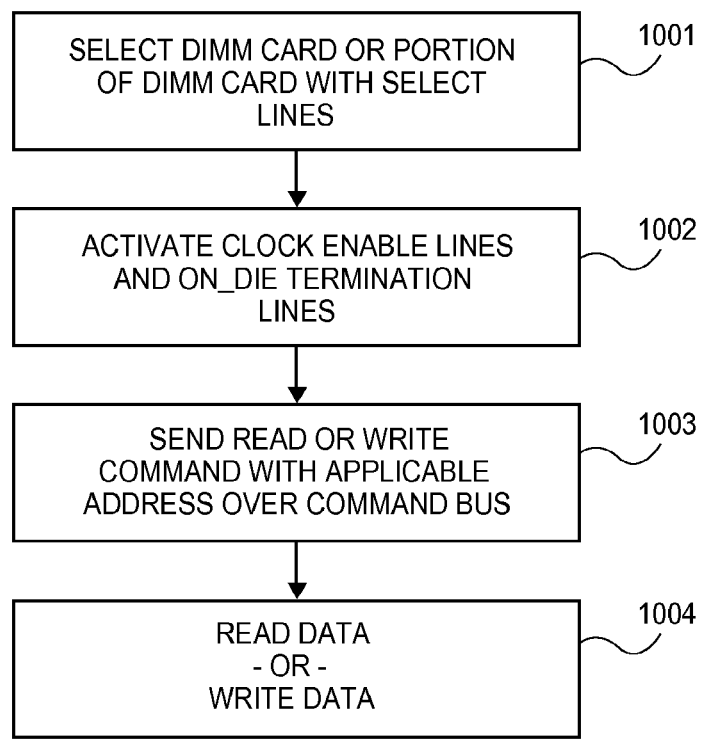
FIG. 10 illustrates a process for accessing near memory.

FIG. 10 shows an atomic operation sequence for read and write operations of a near memory access protocol as applied to near memory (e.g., over a memory channel as just described above). According to the methodology of FIG. 10, a targeted DIMM card (or portion of a DIMM card) amongst multiple DIMM cards that are plugged into a same memory channel is selected through activation of appropriate select lines 1001. Clock enable lines and on-die termination lines are then activated 1002 (conceivably there may be some overlap of the activation of the select lines and the clock enable and on-die termination lines). A read or write command with the applicable address is then sent (e.g., over the command bus) 1003. Only the selected/activated DIMM card (or portion of a DIMM card) can receive and process the command. In the case of a write, write data is written into the activated devices (e.g., from a memory channel data bus) 1004. In the case of a read, read data from the activated devices is presented (e.g., on a memory channel data bus) 1004.

Note that the process of FIG. 10, although depicting atomic operations to near memory in a future memory protocol, can also be construed consistently with existing DDR protocol atomic operations. Moreover, future systems that include near memory and far memory may access near memory with an already existing DDR protocol or in with a future DRAM protocol that systems of the future that only have DRAM system memory technology access DRAM system memory with.

Specifically, in an implementation where the DRAM near memory cache is "in front of" the far memory control logic, and where, the far memory control logic circuitry does not update the DRAM near memory cache on a read transaction having a cache miss, the memory controller will drive signals on the channel in performing steps 1001, 1002, 1003 and provide the write data on the data bus for a write transaction in step 1004. In this case, the memory controller may behave much the same as existing memory controllers or memory controllers of future systems that only have DRAM system memory. The same may be said for the manner in which the memory controller behaves with respect to when: i) cache is first read for either a read or a write transaction; and, ii) cache is written after a cache hit for either a read or a write transaction.

ii. Near Memory Behind

Further still, in implementations where the DRAM near memory cache is "behind" the far memory control logic, for either a read or write of near memory cache, near memory may still be accessed with a protocol that is specific to the near memory devices. For example, the near memory devices may be accessed with a well established (current or future) DRAM DDR protocol. Moreover, even if the near memory devices themselves are specifically signaled by the far memory control logic with signals that differ in some way from a well established DRAM protocol, the memory controller may nevertheless, in ultimately controlling the near memory accesses, apply a well established DRAM protocol on the channel 921 in communicating with the far memory control logic to effect the near memory accesses.

Here, the far memory control logic may perform the local equivalent (i.e., "behind" the far memory control logic rather than on the channel) of any/all of steps 1001, 1002, 1003, or aspects thereof, in various combinations. In addition, the memory controller may also perform each of these steps in various combinations with the far memory control logic including circumstances where far memory logic circuitry is also performing these same steps. For example, the far memory control logic may be designed to act as a "forwarding" device that simply accepts signals from the channel originally provided by the memory controller and re-drives them to its constituent near memory platform.

Alternatively, the far memory control logic may originally create at least some of the signals needed to perform at least some of steps 1001, 1002, 1003 or aspects thereof while the memory controller originally creates signals needed to perform others of the steps. For instance, according to one approach, in performing a cache read, the memory controller may initially drive the select signals on the channel in performing step 1001. In response to the receipt of the select signals 1001, the far memory control logic may simply re-drive these signals to its constituent near memory platform, or, may process and comprehend their meaning and enable/disable the near memory platform (or a portion thereof) according to a different selection signaling scheme than that explicitly presented on the channel by the memory controller. The select signals may also be provided directly to the near memory platform from the channel and also routed to the far memory control logic so the far memory control logic can at least recognize when its constituent near memory platform (or portion thereof) is targeted for the transaction.

In response to recognizing that at least a portion of its constituent near memory devices are targeted for the transaction, the far memory control logic may originally and locally create any/all of the clock enable signals and/or on-die termination signals in step 1002 behind the far memory control logic between the control logic and the near memory storage devices. These signals may be crafted by the far memory control logic from a clock signal or other signal provided on the channel by the memory controller. Any clock enable signals or on-die termination signals not created by the far memory control logic may be provided on the channel by the memory controller and driven to the near memory platform directly, or, re-driven by the near memory control logic.

For near memory cache read operations, the memory controller may perform step 1003 by providing a suitable request and address on the command bus of the channel. The far memory control logic may receive the command from the channel (and locally store its pertinent address information). It may also re-drive or otherwise present the read command and address to the near memory platform. With respect to step 1004, the memory controller will also receive the cache read data. The read data may be presented on the channel's data bus by the far memory control logic circuitry (in re-driving the read data provided by the near memory platform), or, the read data may be driven on the channel's data bus by the near memory platform directly.

With respect to near memory channel operations that occur after a cache read, such as a write to cache after a cache hit for a write transaction, the far memory control logic circuitry or the memory controller may perform any of steps 1001, 1002, 1003 in various combinations consistent with the principles described just above. At one extreme, the far memory control logic circuitry performs each of steps 1001, 1002 and 1003 independently of the memory controller. At another extreme the memory controller performs each of steps 1001, 1002 and 1003, and, the far memory control logic circuitry re-drives all or some of them to the near memory platform, or, receives and comprehends and then applies its own signals to the near memory platform in response. In between these extremes, the far memory control logic may perform some of steps 1001, 1002, and 1003 or aspects thereof while the memory controller performs others of these steps or aspects thereof.

The atomic operations described just above may be integrated as appropriate with the embodiments disclosed above in the preceding sections.

b. Far Memory Access

Recall that where near memory cache is constructed from DRAM, for example, the timing of near memory transactions are precisely understood in terms of the number of clock cycles needed to perform each step of a transaction. That is, for near memory transactions, the number of clock cycles needed to complete a read or write request is known, and, the number of clock cycles needed to satisfy a read or write request is known. As such, near memory accesses may be entirely under the control of the memory controller, or, at least, the memory controller can precisely know the time spent for each near memory access (e.g., for scheduling purposes).

By contrast, for far memory transactions, although the number of clock cycles needed to complete a read or write request over the command bus may be known (because the memory controller is communicating to the near memory control logic circuitry), the number of clock cycles needed to satisfy any such read or write request to the far memory devices themselves is unknown. As will be more apparent in the immediately following discussion, this may lead to the use of an entirely different protocol on the channel for far memory accesses than that used for near memory accesses.

Figure 11:
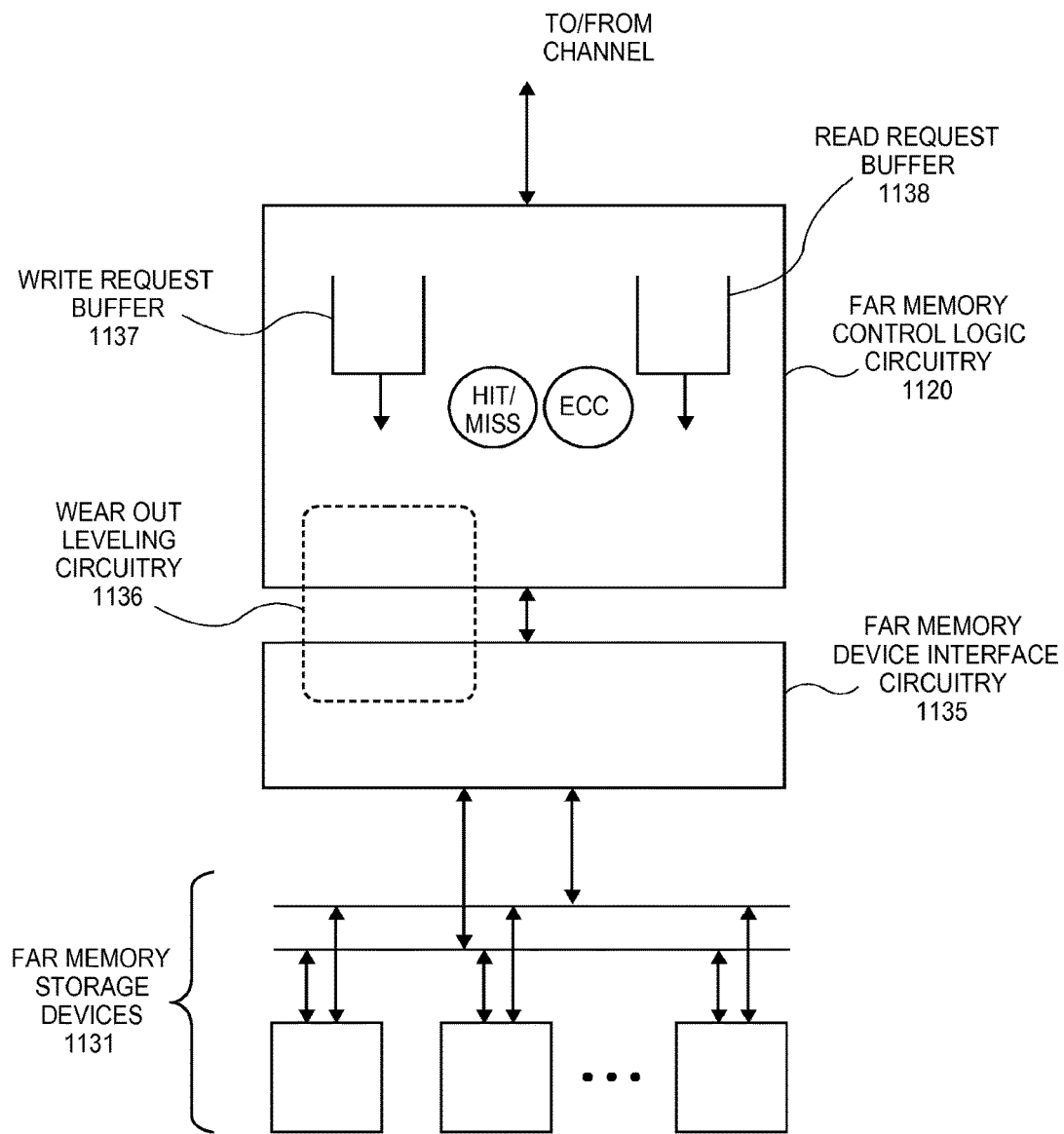
FIG. 11 illustrates an embodiment of far memory control logic circuitry.

FIG. 11 shows a more detailed view of an embodiment of the far memory control logic circuitry 1120 and the associated interface circuitry 1135 that directly interfaces with the far memory devices. Here, for example, the various storage cells of the near memory devices may have different "wear-out" rates depending on how frequently they are accessed (more frequently accessed cells wear out faster than less frequently accessed cells).

In an attempt to keep the reliability of the various storage cells approximately equal, logic circuitry 1120 and/or interface circuitry 1135 may include wear-out leveling algorithm circuitry 1136 that, at appropriate moments, moves the data content of more frequently accessed storage cells to less frequently accessed storage cells (and, likewise, moves the data content of less frequently accessed storage cells to more frequently accessed storage cells). When the far memory control logic has a read or write command ready to issue to the far memory platform, a wear out leveling procedure may or may not be in operation, or, if in operation, the procedure may have only just started or may be near completion or anywhere in between.

These uncertainties, as well as other possible timing uncertainties stemming from the underlying storage technology (such as different access times applied to individual cells as a function of their specific past usage rates), lead to the presence of certain architectural features. Specifically, with respect to the near memory control logic, a far memory write buffer 1137 exists to hold write requests to far memory, and, a far memory read buffer 1138 exists to hold far memory read requests. Here, the presence of the far memory read and write buffers 1137, 1138 permits the queuing, or temporary holding, of read and write requests.

If a read or write request is ready to issue to the far memory devices, but, the far memory devices are not in a position to receive any such request (e.g., because a wear leveling procedure is currently in operation), the requests are held in their respective buffers 1137, 1138 until the far memory devices are ready to accept and process them. Here, the read and write requests may build up in the buffers from continued transmissions of such requests from the memory controller and/or far memory control logic (e.g., in implementations where the far memory control logic is designed to automatically access near memory as described above) until the far memory devices are ready to start receiving them.

A second architectural feature is the ability of the memory controller to interleave different portions of read and write transactions (e.g., from the CPU) on the channel 1121 to enhance system throughput. For example, consider a first read transaction that endures a cache miss which forces a read from far memory. Because the memory controller does not know when the read request to far memory will be serviced, rather than potentially idle the channel waiting for a response, the memory controller is instead free to issue a request that triggers a cache read for a next (read or write) transaction. The process is free to continue until some hard limit is reached.

For example, the memory controller is free to initiate a request for a next read transaction until it recognizes that either the far memory control logic's read buffer 1138 is full (because a cache miss would create a need for a far memory read request) or the far memory control logic's write buffer is full (because a set dirty bit on a cache miss will create a need for a far memory write request). Similarly, the memory controller is free to initiate a request for a next write transaction until it recognizes that the far memory control logic's write buffer is full (because a set dirty bit on a cache miss will create a need for a far memory write request).

In an embodiment, the memory controller maintains a count of credits for each of the write buffer 1137 and the read buffer 1138. Each time the write buffer 1137 or read buffer 1138 accepts a new request, its corresponding credit count is decremented. When the credit count falls below or meets a threshold (such as zero) for either of the buffers 1137, 1138, the memory controller 1137, 1138 refrains from issuing on the channel any requests for a next transaction. As described in more detail below, the memory controller can comprehend the correct credit count for the read buffer by: 1) decrementing the read buffer credit count whenever a read request is understood to be presented to the read buffer 1138 (either by being sent by the memory controller over the channel directly, or, understood to have been created and entered automatically by the far memory control logic); and, 2) decrementing the read buffer credit whenever a read response is presented on the channel 1121 for the memory controller.

Moreover, again as described in more detail below, the memory controller can comprehend the correct credit count for the write buffer by: 1) decrementing the write buffer credit count whenever a write request is understood to be presented to the write buffer 1137 (e.g., by being sent by the memory controller over the channel directly, or, understood to have occurred automatically by the far memory control logic); and, 2) decrementing the write buffer credit whenever a write request is serviced from the write buffer 1137. In an embodiment, again as described in more detail below, the far memory control logic 1120 informs the memory controller of the issuance of write requests from the write buffer 1137 to the far memory storage device platform 1131 by "piggy-backing" such information with a far memory read request response. Here, a read of far memory is returned over the channel 1121 to the memory controller. As such, each time far memory control logic 1120 performs a read of far memory and communicates a response to the memory controller, as part of that communication, the far memory control logic also informs the memory controller of the number of write requests that have issued from the write buffer 1137 since the immediately prior far memory read response.

An additional complication is that, in an embodiment, read requests may be serviced "out of order". For example, according to one design approach for the far memory control logic circuitry, write requests in the write buffer 1137 are screened against read requests in the read buffer 1138. If any of the target addresses between the two buffers match, a read request having one or more matching counterparts in the write buffer is serviced with the new write data associated with the most recent pending write request. If the read request is located in any other location than the front of the read buffer queue 1138, the servicing of the read request will have the effect of servicing the request "out-of-order" with respect to the order in which read requests were entered in the queue 1138. In various embodiments the far memory control logic may also be designed to service requests "out-of-order" because of the underlying far memory technology (which may, at certain times, permit some address space to be available for a read but not all address space).

In order for the memory controller to understand which read request response corresponds to which read request transaction, in an embodiment, when the memory controller sends a read request to the far memory control logic, the memory controller also provides an identifier of the transaction ("TX_ID") to the near memory control logic. When the far memory control logic finally services the request, it includes the transaction identifier with the response.

Recall that FIG. 9a and its discussion pertained to an embodiment of a memory channel and its use by a memory controller for accessing near memory cache with a first (near memory) access protocol. Notably, FIG. 9a is further enhanced to show information that can be "snuck" onto the channel by the memory controller as part of the first (near memory) access protocol—but—is nevertheless used by the far memory controller to potentially trigger a far memory access. FIG. 9b shows the same channel and its use for accessing far memory cache by the memory controller with a second (far memory) access protocol.

Because in various embodiments the tag information of a cache line's full address is stored along with the data of the cache line in near memory cache (e.g., embedded tag information 411, 711, 811), note that FIG. 9a indicates that, when the channel is used to access near memory cache (read or write), some portion of bits lines 942_2 that are nominally reserved for ECC are instead used for the embedded tag information 411, 711. "Stealing" ECC lines to incorporate the embedded tag information rather than extending the size of the data bus permits, for example, DIMM cards manufactured for use in a traditional computer system to be used in a system having both near and far levels of storage. That is, for example, if a DRAM only DIMM were installed in a channel without any far memory (and thus does not act like a cache for the far memory), the full width of the ECC bits would be used for ECC information. By contrast, if a DIMM having DRAM were installed in a channel with far memory (and therefore the DRAM acts like a cache for the far memory), when the DRAM is accessed, some portion of the ECC bits 942_2 would actually be used to store the tag bits of the address of the associated cache line on the data bus. The embedded tag information 411, 711, 811 is present on the ECC lines during step 1004 of FIG. 10 when the data of a near memory cache line is being written into near memory or being read from near memory.

Also recall from above that in certain embodiments the far memory control logic may perform certain acts "automatically" with the assistance of the additional information that is "snuck" to the far memory controller on the memory channel as part of a near memory request. These automatic acts may include: 1) automatically detecting a cache hit or miss; 2) an automatic read of far memory upon recognition of a cache miss and recognition that a read transaction is at play; and, 3) an automatic write to far memory upon recognition of a cache miss coupled with recognition that the dirty bit is set.

As discussed in preceding sections, in order to perform 1), 2) and 3) above, the cache hit or miss is detected by sneaking the transaction's tag information 405, 705, 805 to the far memory control logic as part of the request that triggers the near memory cache access, and, comparing it to the embedded tag information 411, 711, 811 that is stored with the cache line and that is read from near memory.

In an embodiment, referring to FIG. 9a and FIG. 10 the transaction's tag information 405, 705, 805 is snuck to the far memory control logic over the command bus in step 1003 (command phase) in locations that would otherwise be reproduced as unused column and/or row bits on the near memory address bus (e.g., more so column than row). The snarf of the embedded tag information 411, 711, 811 by the far memory control logic can be made in step 1004 of FIG. 10 when the cache line is read from near memory by snarfing the "stolen ECC bits" as described above). The two tags can then be compared.

Moreover, in order to perform 2) or 3) above, the far memory control logic should be able to detect the type of transaction at play (read or write). In the case where near memory is in front of the far memory control logic, again referring to FIG. 9a and FIG. 10, the type of transaction at play can also be snuck to the far memory control logic over the command bus in a manner like that described for 1) just above for a transaction's tag information (e.g., on the command bus during command phase 1003). In the case where the near memory is behind the far memory control logic, it is possible for the far memory control logic to detect whether the overall transaction is a read or write simply by keying off of the transaction's original request from the memory controller (e.g., compare FIGS. 8b and 8d). Otherwise the same operation as for the near memory in front approach can be effected.

Additionally, in order to perform 3) above, referring to FIG. 9a and FIG. 10, the far memory control logic should be able to detect whether the dirty bit is set. Here, since the dirty bit is information that is embedded with the data of a cache line in near memory, another ECC bit is "stolen" as described just above with respect to the embedded tag information 411, 711, 811. As such, the memory controller writes the dirty bit by presenting the appropriate value in one of the ECC bit locations 942_2 of the channel during step 1004 of a near memory write access. Similarly, the far memory control logic can detect the dirty bit by snarfing this same ECC location during a near memory read access.

Referring to FIG. 9b and FIG. 10, in order to address "out-of-order" issues, a transaction identifier can be sent to the far memory control logic circuit as part of a far memory read request. This can also be accomplished by presenting the transaction identifier on the command bus during the command phase 1003 of the far memory read request.

Figure 12A:
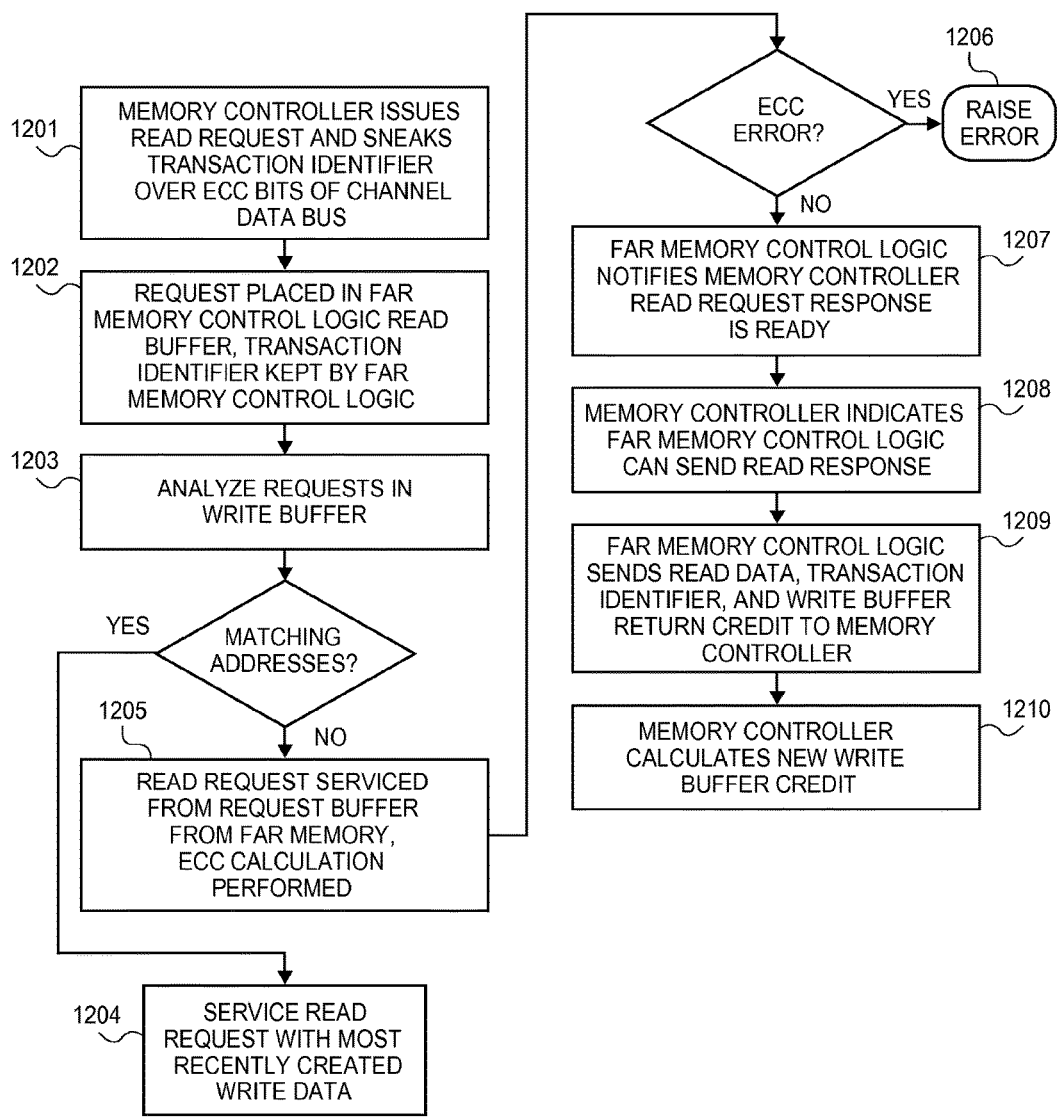
FIGS. 12A-B illustrate atomic processes that may transpire of a memory channel that supports near memory accesses and far memory accesses.

FIG. 12a shows an atomic process for a read access of far memory made over the channel by the memory controller. The process of FIG. 12a may be accomplished, for instance, in cases where the far memory control logic does not automatically perform a read into far memory upon detection of a cache miss for a read transaction and needs to be explicitly requested by the memory controller to perform the far memory read. Moreover, recall that in embodiments described above, the memory controller can issue a read request to the far memory control logic in the case of a cache miss even if the far memory control logic automatically initiates the far memory read (see, e.g., FIGS. 7b and 8b).

Referring to FIGS. 9b, 11 and 12a, a read request having a far memory read address is issued 1201 by the memory controller over the command bus 941. The read request issued over the command bus also includes a transaction identifier that is kept (e.g., in a register) by the far memory control logic 1120.

The request is placed 1202 in a read buffer 1138. Write requests held in a write buffer 1137 are analyzed to see if any have a matching target address 1203. If any do, the data for the read request response is taken from the most recently created write request 1204. If none do, eventually, the read request is serviced from the read buffer 1138, read data is read from the far memory platform 1131, and ECC information for the read data is calculated and compared with the ECC information stored with the read data 1205. If the ECC check fails an error is raised by the far memory control logic

1206. Here, referring to FIG. 9*b*, the error may be signaled over one of the select 943_1, clock enable 943_2 or ODT 943_3 lines.

If the read response was taken from the write buffer 1137 or the ECC check was clean, the far memory control logic 1120 informs the memory controller that it has a read response ready for transmission 1207. In an embodiment, as observed in FIG. 9*b*, this indication 990 is made over one of a select signal line 943_1, clock enable signal line 943_2 or an on-die termination line 943_3 of the channel that is usurped for this purpose. When the memory controller (which in various embodiments has a scheduler to schedule transactions on the channel), decides it can receive the read response, it sends an indication 991 to the far memory control logic that it should begin to send the read response 1208. In an embodiment, as observed in FIG. 9*b*, this indication 991 is also made over one of a select line 943_1, clock enable signal line 943_2 or an on-die termination line 943_3 of the channel that is usurped for this purpose.

The far memory control logic 1120 then determines how many write requests have issued from the write buffer 1137 since the last read response was sent ("write buffer issue count"). The read data is then returned over the channel along with the transaction identifier and the write buffer issue count 1209. In an embodiment, since the ECC calculation was made by the far memory control logic, the data bus lines that are nominally used for ECC are essentially "free". As such, as observed in FIG. 9*b*, the transaction identifier 992 and write buffer issue count 993 are sent along the ECC lines 942_2 of the channel from the far memory controller to the memory controller. Here, the write buffer issue count 993 is used by the memory controller to calculate a new credit count so as to permit the sending of new write requests to the far memory control logic 1210. The memory controller can self regulate its sending of read requests by keeping track of the number of read requests that have been entered into the read buffer 1138 and the number of read responses that have been returned.

Figure 12B:
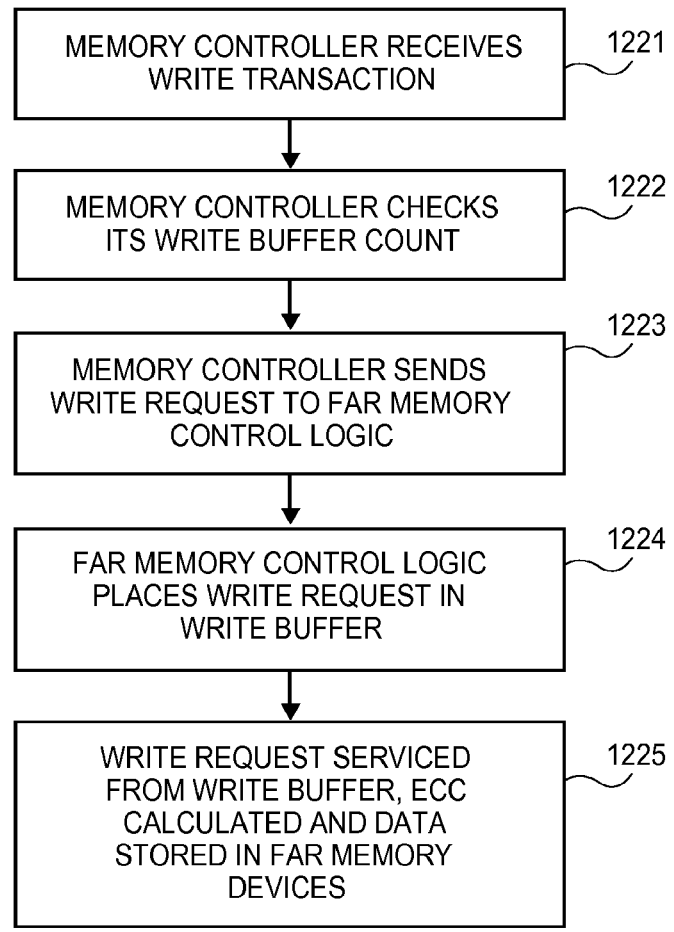

FIG. 12*b* shows a basic atomic process for a write access of far memory over the channel by the memory controller. The process of FIG. 12*b* may be accomplished, for instance, in cases where the far memory control logic does not automatically perform a write into far memory (e.g., on a cache miss with the dirty bit for either a read transaction or a write transaction) and needs to be explicitly requested by the memory controller to do so. The write process of FIG. 12*b* may also be utilized in channels that do not have any resident near memory (e.g., a PCMS only channel). According to the process of FIG. 12*b* the memory controller receives a write transaction 1221. The memory controller checks its write buffer credit count to see if enough credits exist to send a write request 1222. If so, the memory controller sends a write request 1223 to the far memory control logic over the command bus. In response, the far memory control logic places the request in its write buffer 1224. Eventually, the write request is serviced from the write buffer, ECC information is calculated for the data to be written into far memory and stored along with the data into far memory 1224.

Enhanced write process were discussed previously with respect to FIG. 7*d* (near memory in front) and FIG. 8*d* (near memory behind). Here, the operation of the far memory control logic and embodiments of specific components of the channel for effecting these write processes have already been discussed above. Notably, however, in addition, with respect to the enhanced write process of FIG. 7*d*, the memory controller can determine from the cache read information whether a write to far memory is needed in the case of a cache miss and the dirty bit is set. In response, the memory controller can increment its write buffer count as it understands the far memory control logic will automatically perform the write into far memory but will also automatically enter a request into the write buffer 1224 in order to do so. With respect to the enhanced write process of FIG. 8*d*, the memory controller can also receive the cache read information and operate as described just above.

Of course, the far memory atomic operations described above can be utilized, as appropriate, over a channel that has only far memory technology (e.g., a DDR channel only having DIMMs plugged into whose storage technology is only PCMS based).

The far memory control logic as described above can be implemented on one or more semiconductor chips. Likewise the logic circuitry for the memory controller can be implemented on one or more semiconductor chips.

Although much of the above discussion was directed to near memory system memory and far memory system memory devices that were located external to the CPU die and CPU package (e.g., on DIMM cards that plug into a channel that emanates from the CPU package), architecturally, the above embodiments and processes could nevertheless also be implemented within a same CPU package (e.g., where a channel is implemented with conductive traces on a substrate that DRAM and PCMS devices are mounted to along with the CPU die in a same CPU package (far memory control logic could be designed into the CPU die or another die mounted to the substrate) or even on the CPU die itself (e.g., where, besides logic circuitry to, e.g., implement the CPU and memory controller, the CPU die also has integrated thereon DRAM system memory and PCMS system memory, and, the "channel" is implemented with (e.g., multi-level) on-die interconnect wiring).

Training

Training is an embedded configuration scheme by which communicatively coupled semiconductor devices can "figure out" what the appropriate signaling characteristics between them should be. In the case where only DRAM devices are coupled to a same memory channel, the memory controller is trained to the read data provided by each rank of DRAM. The memory controller is also trained to provide properly timed write data to each rank. Training occurs on an 8 bit basis for ×8 DRAMs and on a 4 bit basis for ×4 DRAMs. Differences in trace lengths between 4 or 8 bit groups require this training resolution (within the 4 or 8 bit group, the traces are required to be matched). The host should do the adjustments because the DRAMs no not have adjustment capability. This saves both cost and power on the DRAMs.

When snarfing is to be done because PCMS and DRAM are coupled to a same channel, the far memory controller must be trained also. For reads from near memory, the far memory controller must be trained to accept the read data. If read data is to be snarfed by the DRAMs from the far memory controller, the far memory controller must be trained to properly time data to the DRAMs (which are not adjustable), followed by the host being trained to receive the resulting data. In the case of the far memory controller snarfing write data, a similar two step procedure would be used.

The invention claimed is:

1. A dual in-line memory module (DIMM), comprising:
an interface to a memory channel that supports double data rate (DDR) volatile memory accesses;
non volatile memory to provide read data that is the target of one or more read requests sent to the DIMM by a host and received at the interface;
on board electronic circuitry to:
send to the host an indication that a response to a read request of the one or more read requests sent to the DIMM by the host is ready to be sent to the host; and,
send to the host a corresponding transaction identifier for the response, the corresponding transaction identifier having been uniquely assigned by the host to the read request of the one or more read requests.

2. The DIMM of claim 1 wherein the wherein the non volatile memory comprises resistive storage cells.

3. The DIMM of claim 1 wherein the memory channel conforms to an industry standard specification DDR memory channel.

4. The DIMM of claim 1 wherein the DIMM further comprises ECC circuitry to perform ECC checking on information read from the non volatile memory.

5. The DIMM of claim 1 wherein the DIMM further comprises DRAM volatile memory that is to be accessed through the memory channel.

6. The DIMM of claim 5 wherein the DRAM volatile memory is to be implemented as a memory side cache for the non volatile memory.

7. The DIMM of claim 1 wherein the indication is sent over an on die termination signal line of the memory channel.

8. The DIMM of claim 1 wherein the DIMM is plugged into a computing system.

9. A memory controller, comprising:
an interface to a memory channel that supports double data rate (DDR) volatile memory accesses;
circuitry to direct a read transaction to a DIMM that is coupled to the memory channel and that includes non volatile memory, the read transaction to read information stored in the non volatile memory, a unique transaction identifier assigned to the read transaction by the memory controller and sent to the DIMM so that, after the information and the identifier are sent together by the DIMM to the memory controller to complete the read transaction, the memory controller is able to identify the read transaction even though the information has been received out-of-order with respect to other read transactions directed by the memory controller to the DIMM.

10. The memory controller of claim 9 wherein the transaction identifier is sent by the memory controller to the DIMM over a command bus of the memory channel.

11. The memory controller of claim 9 wherein the memory channel conforms to an industry standard specification DDR memory channel.

12. The memory controller of claim 9 wherein the circuitry is to receive from an on die termination signal line of the memory channel an indication sent by the DIMM that the information is ready to be sent to the memory controller.

13. The memory controller of claim 9 wherein the circuitry is to receive from ECC signal lines of the memory channel the identifier sent by the DIMM to the memory controller.

14. The memory controller of claim 9 wherein the memory controller is integrated into a computing system comprising multiple CPU cores and a networking interface.

15. The memory controller of claim 14 wherein the computing system further comprises DRAM memory coupled to the memory channel.

16. The memory controller of claim 15 wherein the DRAM memory is to act as a memory side cache for the non volatile memory.

17. The memory controller of claim 9 wherein the memory controller is integrated on a semiconductor chip comprising multiple CPU processing cores.

18. The memory controller of claim 17 wherein the semiconductor chip is a component within a computer.

19. A method, comprising:
performing the following with a memory controller that is coupled to a first DIMM and a second DIMM with a memory channel, the first DIMM having volatile memory, the second DIMM having non volatile memory:
reading information from the first DIMM, the reading of the information being performed according to an industry standard DDR protocol;
initiating a read request transaction over the memory channel to the second DIMM, the initiating of the read request transaction comprising sending a unique identifier of the transaction to the second DIMM over the memory channel; and,
receiving information targeted by the read request transaction together with the unique identifier, the information being received out-of-order with respect to the reception of other information of other read transactions and the sending of the respective read requests of the other read transactions.

20. The method of claim 19 wherein the unique identifier is sent over ECC lines of the memory channel.

* * * * *